US006524379B2

(12) United States Patent
Nohr et al.

(10) Patent No.: US 6,524,379 B2
(45) Date of Patent: *Feb. 25, 2003

(54) COLORANTS, COLORANT STABILIZERS, INK COMPOSITIONS, AND IMPROVED METHODS OF MAKING THE SAME

(75) Inventors: Ronald Sinclair Nohr, Alpharetta, GA (US); John G. MacDonald, Decatur, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/760,504

(22) Filed: Jan. 12, 2001

(65) Prior Publication Data

US 2001/0032565 A1 Oct. 25, 2001

Related U.S. Application Data

(60) Provisional application No. 60/175,643, filed on Jan. 12, 2000.

(51) Int. Cl.[7] .......................... C09D 11/02; C07B 47/00; C07D 487/22

(52) U.S. Cl. .................. 106/31.49; 106/31.77

(58) Field of Search ............ 106/31.49, 31.78; 540/145

(56) References Cited

U.S. PATENT DOCUMENTS

| | | | |
|---|---|---|---|
| 28,789 A | 4/1860 | Chang |
| 28,225 A | 11/1860 | Heseltine et al. |
| 575,228 A | 1/1897 | von Gallois |
| 582,853 A | 5/1897 | Feer |
| 893,636 A | 7/1908 | Maywald |
| 1,013,544 A | 1/1912 | Fuerth |
| 1,325,971 A | 12/1919 | Akashi |
| 1,364,406 A | 1/1921 | Olsen |
| 1,436,856 A | 11/1922 | Brenizer et al. |
| 1,744,149 A | 1/1930 | Staehlin |
| 1,803,906 A | 5/1931 | Krieger et al. |
| 1,844,199 A | 2/1932 | Bicknell et al. |
| 1,876,880 A | 9/1932 | Drapal |
| 1,880,572 A | 10/1932 | Wendt et al. |
| 1,880,573 A | 10/1932 | Wendt et al. |
| 1,916,350 A | 7/1933 | Wendt et al. |
| 1,916,779 A | 7/1933 | Wendt et al. |
| 1,955,898 A | 4/1934 | Wendt et al. |
| 1,962,111 A | 6/1934 | Bamberger |
| 2,005,378 A | 6/1935 | Kiel |
| 2,005,511 A | 6/1935 | Stoll et al. |
| 2,049,005 A | 7/1936 | Gaspar |
| 2,054,390 A | 9/1936 | Rust et al. |
| 2,058,489 A | 10/1936 | Murch et al. |
| 2,062,304 A | 12/1936 | Gaspar |
| 2,090,511 A | 8/1937 | Crossley et al. |
| 2,097,119 A | 10/1937 | Eggert |
| 2,106,539 A | 1/1938 | Schnitzspahn |
| 2,111,692 A | 3/1938 | Saunders et al. |
| 2,125,015 A | 7/1938 | Gaspar |
| 2,130,572 A | 9/1938 | Wendt |
| 2,132,154 A | 10/1938 | Gaspar |
| 2,145,960 A | 2/1939 | Wheatley et al. |
| 2,154,996 A | 4/1939 | Rawling |
| 2,159,280 A | 5/1939 | Mannes et al. |
| 2,171,976 A | 9/1939 | Erickson |
| 2,181,800 A | 11/1939 | Crossley et al. |
| 2,185,153 A | 12/1939 | Lecher et al. |
| 2,220,178 A | 11/1940 | Schneider |
| 2,230,590 A | 2/1941 | Eggert et al. |
| 2,237,885 A | 4/1941 | Markush et al. |
| 2,243,630 A | 5/1941 | Houk et al. |
| 2,268,324 A | 12/1941 | Polgar |
| 2,281,895 A | 5/1942 | van Poser et al. |
| 2,328,166 A | 8/1943 | Poigar et al. |
| 2,346,090 A | 4/1944 | Staehle |
| 2,349,090 A | 5/1944 | Haddock |
| 2,356,618 A | 8/1944 | Rossander et al. |
| 2,361,301 A | 10/1944 | Libby, Jr. et al. |
| 2,364,359 A | 12/1944 | Kienle et al. |
| 2,381,145 A | 8/1945 | von Glahn et al. |
| 2,382,904 A | 8/1945 | Federsen |
| 2,386,646 A | 10/1945 | Adams et al. |
| 2,402,106 A | 6/1946 | von Glahn et al. |
| 2,416,145 A | 2/1947 | Biro |
| 2,477,165 A | 7/1949 | Bergstrom |
| 2,527,347 A | 10/1950 | Begstrom |

(List continued on next page.)

FOREIGN PATENT DOCUMENTS

| | | |
|---|---|---|
| AU | 103085 | 4/1937 |
| AU | 12624/88 | 9/1988 |
| BE | 620075 | 5/1962 |

(List continued on next page.)

OTHER PUBLICATIONS

Noguchi, H., UV Curable, Aqueous Ink Jet Ink: Material Design and Performance for Digital Printing, *1998 International Conf. on Digital Printing Technologies*, pp. 107–110, Dec. 31, 1998.

ESP@CENE T databse, JP 10324836 (Omron Corp.), Dec. 8, 1998. abstract.

Derwent World Patents, JP 8002092 (Mitsubishi Paper Mills Ltd.) Jan. 9, 1996. abstract.

(List continued on next page.)

*Primary Examiner*—Helene Klemanski
(74) *Attorney, Agent, or Firm*—Kilpatrick Stockton LLP

(57) ABSTRACT

The present invention relates to a family of new porphine compounds for use as colorants and/or colorant stabilizers. The new porphine compounds may be used alone or may be used in combination with one or more colorants to provide light stability to colorants. The present invention further relates to inks containing the new porphine compounds and a method for making the new compounds. The present invention also relates to improved methods of making porphines. The improved processes allow the production of porphines at lower cost and higher yields compared to conventional methods of making porphines.

37 Claims, No Drawings

U.S. PATENT DOCUMENTS

| | | |
|---|---|---|
| 2,580,461 A | 1/1952 | Pearl |
| 2,601,669 A | 6/1952 | Tullsen |
| 2,612,494 A | 9/1952 | von Glahn et al. |
| 2,612,495 A | 9/1952 | von Glahn et al. |
| 2,628,959 A | 2/1953 | von Glahn et al. |
| 2,647,080 A | 7/1953 | Joyce |
| 2,680,685 A | 6/1954 | Ratchford |
| 2,728,784 A | 12/1955 | Tholstrup et al. |
| 2,732,301 A | 1/1956 | Robertson et al. |
| 2,744,103 A | 5/1956 | Koch |
| 2,757,090 A | 7/1956 | Meugebauer et al. |
| 2,763,550 A | 9/1956 | Lovick |
| 2,768,171 A | 10/1956 | Clarke et al. |
| 2,773,056 A | 12/1956 | Helfaer |
| 2,798,000 A | 7/1957 | Monterman |
| 2,809,189 A | 10/1957 | Stanley et al. |
| 2,827,358 A | 3/1958 | Kaplan et al. |
| 2,834,773 A | 5/1958 | Scalera et al. |
| 2,875,045 A | 2/1959 | Lurie |
| 2,892,865 A | 6/1959 | Giraldi et al. |
| 2,897,187 A | 7/1959 | Koch |
| 2,936,241 A | 5/1960 | Sharp et al. |
| 2,940,853 A | 6/1960 | Sagura et al. |
| 2,955,067 A | 10/1960 | McBurney et al. |
| 2,992,129 A | 7/1961 | Gauthier |
| 2,992,198 A | 7/1961 | Funahashi |
| 3,030,208 A | 4/1962 | Schellenberg et al. |
| 3,071,815 A | 1/1963 | MacKinnon |
| 3,075,014 A | 1/1963 | Palopoli et al. |
| 3,076,813 A | 2/1963 | Sharp |
| 3,104,973 A | 9/1963 | Sprague et al. |
| 3,114,634 A | 12/1963 | Brown et al. |
| 3,121,632 A | 2/1964 | Sprague et al. |
| 3,123,647 A | 3/1964 | Duennenberger et al. |
| 3,133,049 A | 5/1964 | Hertel et al. |
| 3,140,949 A | 7/1964 | Sprague et al. |
| 3,154,416 A | 10/1964 | Fidelman |
| 3,155,509 A | 11/1964 | Roscow |
| 3,175,905 A | 3/1965 | Wiesbaden |
| 3,178,285 A | 4/1965 | Anderau et al. |
| 3,238,163 A | 3/1966 | O'Neill |
| 3,242,215 A | 3/1966 | Heitmiller |
| 3,248,337 A | 4/1966 | Zirker et al. |
| 3,266,973 A | 8/1966 | Crowley |
| 3,282,886 A | 11/1966 | Gadecki |
| 3,284,205 A | 11/1966 | Sprague et al. |
| 3,300,314 A | 1/1967 | Rauner et al. |
| 3,304,297 A | 2/1967 | Wegmann et al. |
| 3,305,361 A | 2/1967 | Gaynor et al. |
| 3,313,797 A | 4/1967 | Kissa |
| 3,320,080 A | 5/1967 | Mazzarella et al. |
| 3,330,659 A | 7/1967 | Wainer |
| 3,341,492 A | 9/1967 | Champ et al. |
| 3,359,109 A | 12/1967 | Harder et al. |
| 3,361,827 A | 1/1968 | Biletch |
| 3,363,969 A | 1/1968 | Brooks |
| 3,385,700 A | 5/1968 | Willems et al. |
| 3,397,984 A | 8/1968 | Williams et al. |
| 3,415,875 A | 12/1968 | Luethi et al. |
| 3,418,118 A | 12/1968 | Thommes et al. |
| 3,445,234 A | 5/1969 | Cescon et al. |
| 3,453,258 A | 7/1969 | Parmerter et al. |
| 3,453,259 A | 7/1969 | Parmerter et al. |
| 3,464,841 A | 9/1969 | Skofronick |
| 3,467,647 A | 9/1969 | Benninga |
| 3,479,185 A | 11/1969 | Chambers |
| 3,488,269 A | 1/1970 | Allen et al. |
| 3,502,476 A | 3/1970 | Kohei et al. |
| 3,503,744 A | 3/1970 | Itano et al. |
| 3,514,597 A | 5/1970 | Haes et al. |
| 3,541,142 A | 11/1970 | Cragoe, Jr. |
| 3,546,161 A | 12/1970 | Wolheim |
| 3,547,646 A | 12/1970 | Hori et al. |
| 3,549,367 A | 12/1970 | Chang et al. |
| 3,553,710 A | 1/1971 | Lloyd et al. |
| 3,563,931 A | 2/1971 | Horiguchi |
| 3,565,753 A | 2/1971 | Yurkowitz |
| 3,574,624 A | 4/1971 | Reynolds et al. |
| 3,579,533 A | 5/1971 | Yalman |
| 3,595,655 A | 7/1971 | Robinson et al. |
| 3,595,657 A | 7/1971 | Robinson et al. |
| 3,595,658 A | 7/1971 | Gerlach et al. |
| 3,595,659 A | 7/1971 | Gerlach et al. |
| 3,607,639 A | 9/1971 | Krefeld et al. |
| 3,607,693 A | 9/1971 | Heine et al. |
| 3,607,863 A | 9/1971 | Dosch |
| 3,615,562 A | 10/1971 | Harrison et al. |
| 3,617,288 A | 11/1971 | Hartman et al. |
| 3,617,335 A | 11/1971 | Kumura et al. |
| 3,619,238 A | 11/1971 | Kimura et al. |
| 3,619,239 A | 11/1971 | Osada et al. |
| 3,637,337 A | 1/1972 | Pilling |
| 3,637,581 A | 1/1972 | Horioguchi et al. |
| 3,642,472 A | 2/1972 | Mayo |
| 3,647,467 A | 3/1972 | Grubb |
| 3,652,275 A | 3/1972 | Baum et al. |
| 3,660,542 A | 5/1972 | Adachi et al. |
| 3,667,954 A | 6/1972 | Itano et al. |
| 3,668,188 A | 6/1972 | King et al. |
| 3,669,925 A | 6/1972 | King et al. |
| 3,671,096 A | 6/1972 | Mackin |
| 3,671,251 A | 6/1972 | Houle et al. |
| 3,676,690 A | 7/1972 | McMillin et al. |
| 3,678,044 A | 7/1972 | Adams |
| 3,689,565 A | 9/1972 | Hoffmann et al. |
| 3,694,241 A | 9/1972 | Guthrie et al. |
| 3,695,879 A | 10/1972 | Laming et al. |
| 3,697,280 A | 10/1972 | Strilko |
| 3,705,043 A | 12/1972 | Zablak |
| 3,707,371 A | 12/1972 | Files |
| 3,729,313 A | 4/1973 | Smith |
| 3,737,628 A | 6/1973 | Azure |
| 3,765,896 A | 10/1973 | Fox |
| 3,775,130 A | 11/1973 | Enomoto et al. |
| 3,788,849 A | 1/1974 | Taguchi et al. |
| 3,799,773 A | 3/1974 | Watarai et al. |
| 3,800,439 A | 4/1974 | Sokolski et al. |
| 3,801,329 A | 4/1974 | Sandner et al. |
| 3,817,752 A | 6/1974 | Laridon et al. |
| 3,840,338 A | 10/1974 | Zviak et al. |
| 3,844,790 A | 10/1974 | Chang et al. |
| 3,870,524 A | 3/1975 | Watanabe et al. |
| 3,873,500 A | 3/1975 | Kato et al. |
| 3,876,496 A | 4/1975 | Lozano |
| 3,887,450 A | 6/1975 | Gilano et al. |
| 3,895,949 A | 7/1975 | Akamatsu |
| 3,901,779 A | 8/1975 | Mani |
| 3,904,562 A | 9/1975 | Hopfenberg et al. |
| 3,910,933 A | 10/1975 | Avar et al. |
| 3,914,165 A | 10/1975 | Gaske |
| 3,914,166 A | 10/1975 | Rudolph et al. |
| 3,915,824 A | 10/1975 | McGinniss |
| 3,919,323 A | 11/1975 | Houlihan et al. |
| 3,926,641 A | 12/1975 | Rosen |
| 3,928,264 A | 12/1975 | Young, Jr. et al. |
| 3,933,682 A | 1/1976 | Bean |
| 3,952,129 A | 4/1976 | Matsukawa et al. |
| 3,960,685 A | 6/1976 | Sano et al. |
| 3,965,157 A | 6/1976 | Harrison |
| 3,978,132 A | 8/1976 | Houlihan et al. |
| 3,984,248 A | 10/1976 | Sturmer |

| Patent No. | Date | Inventor |
|---|---|---|
| 3,988,154 A | 10/1976 | Sturmer |
| 4,004,998 A | 1/1977 | Rosen |
| 4,012,256 A | 3/1977 | Levinos |
| 4,017,652 A | 4/1977 | Gruber |
| 4,022,674 A | 5/1977 | Rosen |
| 4,024,324 A | 5/1977 | Sparks |
| 4,039,332 A | 8/1977 | Kokelenberg et al. |
| 4,043,819 A | 8/1977 | Baumann |
| 4,048,034 A | 9/1977 | Martan |
| 4,054,719 A | 10/1977 | Cordes, III |
| 4,056,665 A | 11/1977 | Tayler et al. |
| 4,058,400 A | 11/1977 | Crivello |
| 4,067,892 A | 1/1978 | Thorne et al. |
| 4,071,424 A | 1/1978 | Dart et al. |
| 4,073,968 A | 2/1978 | Miyamoto et al. |
| 4,077,769 A | 3/1978 | Garcia |
| 4,079,183 A | 3/1978 | Green |
| 4,085,062 A | 4/1978 | Virgilio et al. |
| 4,090,877 A | 5/1978 | Streeper |
| 4,100,047 A | 7/1978 | McCarty |
| 4,105,572 A | 8/1978 | Gorondy |
| 4,107,733 A | 8/1978 | Schickendanz |
| 4,110,112 A | 8/1978 | Roman et al. |
| 4,111,699 A | 9/1978 | Krueger |
| 4,114,028 A | 9/1978 | Baio et al. |
| 4,126,412 A | 11/1978 | Masson et al. |
| 4,132,562 A | 1/1979 | Burke, Jr. et al. |
| 4,141,807 A | 2/1979 | Via |
| 4,144,156 A | 3/1979 | Kuesters et al. |
| 4,148,658 A | 4/1979 | Kondoh et al. |
| 4,162,162 A | 7/1979 | Dueber |
| 4,171,977 A | 10/1979 | Hasegawa et al. |
| 4,179,577 A | 12/1979 | Green |
| 4,181,807 A | 1/1980 | Green |
| 4,190,671 A | 2/1980 | Vanstone et al. |
| 4,197,080 A | 4/1980 | Mee |
| 4,199,420 A | 4/1980 | Photis |
| 4,229,172 A | 10/1980 | Baumann et al. |
| 4,232,106 A | 11/1980 | Iwasaki et al. |
| 4,238,492 A | 12/1980 | Majoie |
| 4,239,843 A | 12/1980 | Hara et al. |
| 4,239,850 A | 12/1980 | Kita et al. |
| 4,241,155 A | 12/1980 | Hara et al. |
| 4,242,430 A | 12/1980 | Hara et al. |
| 4,242,431 A | 12/1980 | Hara et al. |
| 4,245,018 A | 1/1981 | Hara et al. |
| 4,245,033 A | 1/1981 | Eida et al. |
| 4,245,995 A | 1/1981 | Hugl et al. |
| 4,246,330 A | 1/1981 | Hara et al. |
| 4,248,949 A | 2/1981 | Hara et al. |
| 4,250,096 A | 2/1981 | Kvita et al. |
| 4,251,622 A | 2/1981 | Kimoto et al. |
| 4,251,662 A | 2/1981 | Ozawa et al. |
| 4,254,195 A | 3/1981 | Hara et al. |
| 4,256,493 A | 3/1981 | Yokoyama et al. |
| 4,256,817 A | 3/1981 | Hara et al. |
| 4,258,123 A | 3/1981 | Nagashima et al. |
| 4,258,367 A | 3/1981 | Mansukhani |
| 4,259,432 A | 3/1981 | Kondoh et al. |
| 4,262,936 A | 4/1981 | Miyamoto |
| 4,268,605 A | 5/1981 | Hara et al. |
| 4,268,667 A | 5/1981 | Anderson |
| 4,269,926 A | 5/1981 | Hara et al. |
| 4,270,130 A | 5/1981 | Houle et al. |
| 4,271,252 A | 6/1981 | Hara et al. |
| 4,271,253 A | 6/1981 | Hara et al. |
| 4,272,244 A | 6/1981 | Schlick |
| 4,276,211 A | 6/1981 | Singer et al. |
| 4,277,497 A | 7/1981 | Fromantin |
| 4,279,653 A | 7/1981 | Makishima et al. |
| 4,279,982 A | 7/1981 | Iwasaki et al. |
| 4,279,985 A | 7/1981 | Nonogaki et al. |
| 4,284,485 A | 8/1981 | Berner |
| 4,288,631 A | 9/1981 | Ching |
| 4,289,844 A | 9/1981 | Specht et al. |
| 4,290,870 A | 9/1981 | Kondoh et al. |
| 4,293,458 A | 10/1981 | Gruenberger et al. |
| 4,298,679 A | 11/1981 | Shinozaki et al. |
| 4,300,123 A | 11/1981 | McMillin et al. |
| 4,301,223 A | 11/1981 | Nakamura et al. |
| 4,302,606 A | 11/1981 | Barabas et al. |
| 4,306,014 A | 12/1981 | Kunikane et al. |
| 4,307,182 A | 12/1981 | Dalzell et al. |
| 4,308,400 A | 12/1981 | Felder et al. |
| 4,315,807 A | 2/1982 | Felder et al. |
| 4,318,705 A | 3/1982 | Nowak et al. |
| 4,318,791 A | 3/1982 | Felder et al. |
| 4,321,118 A | 3/1982 | Felder et al. |
| 4,335,054 A | 6/1982 | Blaser et al. |
| 4,335,055 A | 6/1982 | Blaser et al. |
| 4,336,323 A | 6/1982 | Winslow |
| 4,343,891 A | 8/1982 | Aasen et al. |
| 4,345,011 A | 8/1982 | Drexhage |
| 4,347,111 A | 8/1982 | Gehlhaus et al. |
| 4,349,617 A | 9/1982 | Kawashiri et al. |
| 4,350,753 A | 9/1982 | Shelnut et al. |
| 4,351,893 A | 9/1982 | Anderson |
| 4,356,247 A | 10/1982 | Aotani et al. |
| 4,356,255 A | 10/1982 | Tachikawa et al. |
| 4,357,468 A | 11/1982 | Szejtli et al. |
| 4,359,524 A | 11/1982 | Masuda et al. |
| 4,362,806 A | 12/1982 | Whitmore |
| 4,367,072 A | 1/1983 | Vogtle et al. |
| 4,367,280 A | 1/1983 | Kondo et al. |
| 4,369,283 A | 1/1983 | Altschuler |
| 4,370,401 A | 1/1983 | Winslow et al. |
| 4,372,582 A | 2/1983 | Geisler |
| 4,373,017 A | 2/1983 | Masukawa et al. |
| 4,373,020 A | 2/1983 | Winslow |
| 4,374,984 A | 2/1983 | Eichler et al. |
| 4,376,887 A | 3/1983 | Greenaway et al. |
| 4,383,835 A | 5/1983 | Preuss et al. |
| 4,390,616 A | 6/1983 | Sato et al. |
| 4,391,867 A | 7/1983 | Derick et al. |
| 4,399,209 A | 8/1983 | Sanders, et al. |
| 4,400,173 A | 8/1983 | Beavan |
| 4,401,470 A | 8/1983 | Bridger |
| 4,416,961 A | 11/1983 | Drexhage |
| 4,421,559 A | 12/1983 | Owatari |
| 4,424,325 A | 1/1984 | Tsunoda et al. |
| 4,425,162 A | 1/1984 | Sugiyama |
| 4,425,424 A | 1/1984 | Altland et al. |
| 4,426,153 A | 1/1984 | Libby et al. |
| 4,434,035 A | 2/1984 | Eichler et al. |
| 4,440,827 A | 4/1984 | Miyamoto et al. |
| 4,447,521 A | 5/1984 | Tiers et al. |
| 4,450,227 A | 5/1984 | Holmes et al. |
| 4,460,676 A | 7/1984 | Fabel |
| 4,467,112 A | 8/1984 | Matsuura et al. |
| 4,475,999 A | 10/1984 | Via |
| 4,477,681 A | 10/1984 | Gehlhaus et al. |
| 4,489,334 A | 12/1984 | Owatari |
| 4,495,041 A | 1/1985 | Goldstein |
| 4,496,447 A | 1/1985 | Eichler et al. |
| 4,500,355 A | 2/1985 | Shimada et al. |
| 4,508,570 A | 4/1985 | Fugii et al. |
| 4,510,392 A | 4/1985 | Litt et al. |
| 4,523,924 A | 6/1985 | Lacroix |
| 4,524,122 A | 6/1985 | Weber et al. |
| 4,534,838 A | 8/1985 | Lin et al. |
| 4,548,896 A | 10/1985 | Sabongi et al. |
| 4,555,474 A | 11/1985 | Kawamura |

| | | |
|---|---|---|
| 4,557,730 A | 12/1985 | Bennett et al. |
| 4,559,371 A | 12/1985 | Hüsler et al. |
| 4,564,560 A | 1/1986 | Tani et al. |
| 4,565,769 A | 1/1986 | Dueber et al. |
| 4,567,171 A | 1/1986 | Mangum |
| 4,571,377 A | 2/1986 | McGinniss et al. |
| 4,582,862 A | 4/1986 | Berner et al. |
| 4,595,745 A | 6/1986 | Nakano et al. |
| 4,604,344 A | 8/1986 | Irving et al. |
| 4,605,442 A | 8/1986 | Kawashita et al. |
| 4,613,334 A | 9/1986 | Thomas et al. |
| 4,614,723 A | 9/1986 | Schmidt et al. |
| 4,617,380 A | 10/1986 | Hinson et al. |
| 4,620,875 A | 11/1986 | Shimada et al. |
| 4,620,876 A | 11/1986 | Fugil et al. |
| 4,622,286 A | 11/1986 | Sheets |
| 4,631,085 A | 12/1986 | Kawanishi et al. |
| 4,632,891 A | 12/1986 | Banks et al. |
| 4,632,895 A | 12/1986 | Patel et al. |
| 4,634,644 A | 1/1987 | Irving et al. |
| 4,638,340 A | 1/1987 | Iiyama et al. |
| 4,647,310 A | 3/1987 | Shimada et al. |
| 4,655,783 A | 4/1987 | Reinert et al. |
| 4,663,275 A | 5/1987 | West et al. |
| 4,663,641 A | 5/1987 | Iiyama et al. |
| 4,668,533 A | 5/1987 | Miller |
| 4,672,041 A | 6/1987 | Jain |
| 4,698,291 A | 10/1987 | Koibuchi et al. |
| 4,701,402 A | 10/1987 | Patel et al. |
| 4,702,996 A | 10/1987 | Griffing et al. |
| 4,704,133 A | 11/1987 | Reinert et al. |
| 4,707,161 A | 11/1987 | Thomas et al. |
| 4,707,425 A | 11/1987 | Sasagawa et al. |
| 4,707,430 A | 11/1987 | Ozawa et al. |
| 4,711,668 A | 12/1987 | Shimada et al. |
| 4,711,802 A | 12/1987 | Tannenbaum |
| 4,713,113 A | 12/1987 | Shimada et al. |
| 4,720,450 A | 1/1988 | Ellis |
| 4,721,531 A | 1/1988 | Wildeman et al. |
| 4,721,734 A | 1/1988 | Gehihaus et al. |
| 4,724,021 A | 2/1988 | Martin et al. |
| 4,724,201 A | 2/1988 | Okazaki et al. |
| 4,725,527 A | 2/1988 | Robillard |
| 4,727,824 A | 3/1988 | Ducharme et al. |
| 4,732,615 A | 3/1988 | Kawashita et al. |
| 4,737,190 A | 4/1988 | Shimada et al. |
| 4,737,438 A | 4/1988 | Ito et al. |
| 4,740,451 A | 4/1988 | Kohara |
| 4,745,042 A | 5/1988 | Sasago et al. |
| 4,746,735 A | 5/1988 | Kruper, Jr. et al. |
| 4,752,341 A | 6/1988 | Rock |
| 4,755,450 A | 7/1988 | Sanders et al. |
| 4,761,181 A | 8/1988 | Suzuki |
| 4,766,050 A | 8/1988 | Jerry |
| 4,766,055 A | 8/1988 | Kawabata et al. |
| 4,770,667 A | 9/1988 | Evans et al. |
| 4,772,291 A | 9/1988 | Shibanai et al. |
| 4,772,541 A | 9/1988 | Gottschalk |
| 4,775,386 A | 10/1988 | Reinert et al. |
| 4,786,586 A | 11/1988 | Lee et al. |
| 4,789,382 A | 12/1988 | Neumann et al. |
| 4,790,565 A | 12/1988 | Steed |
| 4,800,149 A | 1/1989 | Gottschalk |
| 4,803,008 A | 2/1989 | Ciolino et al. |
| 4,808,189 A | 2/1989 | Oishi et al. |
| 4,812,139 A | 3/1989 | Brodmann |
| 4,812,517 A | 3/1989 | West |
| 4,813,970 A | 3/1989 | Kirjanov et al. |
| 4,822,714 A | 4/1989 | Sanders |
| 4,831,068 A | 5/1989 | Reinert et al. |
| 4,834,771 A | 5/1989 | Yamauchi et al. |
| 4,837,106 A | 6/1989 | Ishikawa et al. |
| 4,837,331 A | 6/1989 | Yamanishi et al. |
| 4,838,938 A | 6/1989 | Tomida et al. |
| 4,839,269 A | 6/1989 | Okazaki et al. |
| 4,849,320 A | 7/1989 | Irving et al. |
| 4,853,037 A | 8/1989 | Johnson et al. |
| 4,853,398 A | 8/1989 | Carr et al. |
| 4,854,971 A | 8/1989 | Gane et al. |
| 4,857,438 A | 8/1989 | Loerzer et al. |
| 4,861,916 A | 8/1989 | Kohler et al. |
| 4,865,942 A | 9/1989 | Gottschalk et al. |
| 4,874,391 A | 10/1989 | Reinert |
| 4,874,899 A | 10/1989 | Hoelderich et al. |
| 4,885,395 A | 12/1989 | Hoelderich |
| 4,886,774 A | 12/1989 | Doi |
| 4,892,941 A | 1/1990 | Dolphin et al. |
| 4,895,880 A | 1/1990 | Gottschalk |
| 4,900,581 A | 2/1990 | Stuke et al. |
| 4,902,299 A | 2/1990 | Anton |
| 4,902,725 A | 2/1990 | Moore |
| 4,902,787 A | 2/1990 | Freeman |
| 4,911,732 A | 3/1990 | Neumann et al. |
| 4,911,899 A | 3/1990 | Hagiwara et al. |
| 4,917,956 A | 4/1990 | Rohrbach |
| 4,921,317 A | 5/1990 | Suzuki et al. |
| 4,925,770 A | 5/1990 | Ichiura et al. |
| 4,925,777 A | 5/1990 | Inoue et al. |
| 4,926,190 A | 5/1990 | Lavar |
| 4,933,265 A | 6/1990 | Inoue et al. |
| 4,933,948 A | 6/1990 | Herkstroeter |
| 4,937,161 A | 6/1990 | Kita et al. |
| 4,942,113 A | 7/1990 | Trundle |
| 4,944,988 A | 7/1990 | Yasuda et al. |
| 4,950,304 A | 8/1990 | Reinert et al. |
| 4,952,478 A | 8/1990 | Miyagawa et al. |
| 4,952,680 A | 8/1990 | Schmeidl |
| 4,954,380 A | 9/1990 | Kanome et al. |
| 4,954,416 A | 9/1990 | Wright et al. |
| 4,956,254 A | 9/1990 | Washizu et al. |
| 4,964,871 A | 10/1990 | Reinert et al. |
| 4,965,294 A | 10/1990 | Ohngemach et al. |
| 4,966,607 A | 10/1990 | Shinoki et al. |
| 4,966,833 A | 10/1990 | Inoue |
| 4,968,596 A | 11/1990 | Inoue et al. |
| 4,968,813 A | 11/1990 | Rule et al. |
| 4,985,345 A | 1/1991 | Hayakawa et al. |
| 4,987,056 A | 1/1991 | Imahashi et al. |
| 4,988,561 A | 1/1991 | Wason |
| 4,997,745 A | 3/1991 | Kawamura et al. |
| 5,001,330 A | 3/1991 | Koch |
| 5,002,853 A | 3/1991 | Aoai et al. |
| 5,002,993 A | 3/1991 | West et al. |
| 5,003,142 A | 3/1991 | Fuller |
| 5,006,758 A | 4/1991 | Gellert et al. |
| 5,013,959 A | 5/1991 | Kogelschatz |
| 5,017,195 A | 5/1991 | Satou et al. |
| 5,023,129 A | 6/1991 | Morganti et al. |
| 5,025,036 A | 6/1991 | Carson et al. |
| 5,026,425 A | 6/1991 | Hindagolla et al. |
| 5,026,427 A | 6/1991 | Mitchell et al. |
| 5,028,262 A | 7/1991 | Barlow, Jr. et al. |
| 5,028,792 A | 7/1991 | Mullis |
| 5,030,243 A | 7/1991 | Reinert |
| 5,030,248 A | 7/1991 | Meszaros |
| 5,034,526 A | 7/1991 | Bonham et al. |
| 5,037,726 A | 8/1991 | Kojima et al. |
| 5,045,435 A | 9/1991 | Adams et al. |
| 5,045,573 A | 9/1991 | Kohler et al. |
| 5,047,556 A | 9/1991 | Kohler et al. |
| 5,049,777 A | 9/1991 | Mechtersheimer |
| 5,053,320 A | 10/1991 | Robbillard |

| | | |
|---|---|---|
| 5,055,579 A | 10/1991 | Pawlowski et al. |
| 5,057,562 A | 10/1991 | Reinert |
| 5,068,140 A | 11/1991 | Malhotra et al. |
| 5,068,364 A | 11/1991 | Takagaki et al. |
| 5,069,681 A | 12/1991 | Bouwknegt et al. |
| 5,070,001 A | 12/1991 | Stahlhofen |
| 5,073,448 A | 12/1991 | Vieira et al. |
| 5,074,885 A | 12/1991 | Reinert |
| 5,076,808 A | 12/1991 | Hahn et al. |
| 5,077,402 A | 12/1991 | Desobry et al. |
| 5,085,698 A | 2/1992 | Ma et al. |
| 5,087,550 A | 2/1992 | Blum et al. |
| 5,089,050 A | 2/1992 | Vieira et al. |
| 5,089,374 A | 2/1992 | Saeva |
| 5,096,456 A | 3/1992 | Reinert et al. |
| 5,096,489 A | 3/1992 | Laver |
| 5,096,781 A | 3/1992 | Vieira et al. |
| 5,098,477 A | 3/1992 | Vieira et al. |
| 5,098,793 A | 3/1992 | Rohrbach et al. |
| 5,098,806 A | 3/1992 | Robillard |
| 5,106,723 A | 4/1992 | West et al. |
| 5,108,505 A | 4/1992 | Moffat |
| 5,108,874 A | 4/1992 | Griffing et al. |
| 5,110,706 A | 5/1992 | Yumoto et al. |
| 5,110,709 A | 5/1992 | Aoai et al. |
| 5,114,832 A | 5/1992 | Zertani et al. |
| 5,124,723 A | 6/1992 | Laver |
| 5,130,227 A | 7/1992 | Wade et al. |
| 5,133,803 A | 7/1992 | Moffatt |
| 5,135,940 A | 8/1992 | Belander et al. |
| 5,139,572 A | 8/1992 | Kawashima |
| 5,139,687 A | 8/1992 | Borgher, Sr. et al. |
| 5,141,556 A | 8/1992 | Matrick |
| 5,141,797 A | 8/1992 | Wheeler |
| 5,144,964 A | 9/1992 | Damian |
| 5,147,901 A | 9/1992 | Rutsch et al. |
| 5,153,104 A | 10/1992 | Rossman et al. |
| 5,153,105 A | 10/1992 | Sher et al. |
| 5,153,166 A | 10/1992 | Jain et al. |
| 5,160,346 A | 11/1992 | Fuso et al. |
| 5,160,372 A | 11/1992 | Matrick |
| 5,166,041 A | 11/1992 | Murofushi et al. |
| 5,169,436 A | 12/1992 | Matrick |
| 5,169,438 A | 12/1992 | Matrick |
| 5,173,112 A | 12/1992 | Matrick et al. |
| 5,176,984 A | 1/1993 | Hipps, Sr. et al. |
| 5,178,420 A | 1/1993 | Shelby |
| 5,180,425 A | 1/1993 | Matrick et al. |
| 5,180,624 A | 1/1993 | Kojima et al. |
| 5,180,652 A | 1/1993 | Yamaguchi et al. |
| 5,181,935 A | 1/1993 | Reinert et al. |
| 5,185,236 A | 2/1993 | Shiba et al. |
| 5,187,045 A | 2/1993 | Bonham et al. |
| 5,187,049 A | 2/1993 | Sher et al. |
| 5,190,565 A | 3/1993 | Berenbaum et al. |
| 5,190,710 A | 3/1993 | Kletecka |
| 5,190,845 A | 3/1993 | Hashimoto et al. |
| 5,193,854 A | 3/1993 | Borowski, Jr. et al. |
| 5,196,295 A | 3/1993 | Davis |
| 5,197,991 A | 3/1993 | Rembold |
| 5,198,330 A | 3/1993 | Martic et al. |
| 5,202,209 A | 4/1993 | Winnik et al. |
| 5,202,210 A | 4/1993 | Matsuoka et al. |
| 5,202,211 A | 4/1993 | Vercoulen |
| 5,202,212 A | 4/1993 | Shin et al. |
| 5,202,213 A | 4/1993 | Nakahara et al. |
| 5,202,215 A | 4/1993 | Kanakura et al. |
| 5,202,221 A | 4/1993 | Imai et al. |
| 5,205,861 A | 4/1993 | Matrick |
| 5,208,136 A | 5/1993 | Zanoni et al. |
| 5,209,814 A | 5/1993 | Felten et al. |
| 5,219,703 A | 6/1993 | Bugner et al. |
| 5,221,334 A | 6/1993 | Ma et al. |
| 5,224,197 A | 6/1993 | Zanoni et al. |
| 5,224,987 A | 7/1993 | Matrick |
| 5,226,957 A | 7/1993 | Wickramanayake et al. |
| 5,227,022 A | 7/1993 | Leonhardt et al. |
| 5,230,982 A | 7/1993 | Davis et al. |
| 5,241,059 A | 8/1993 | Yoshinaga |
| 5,244,476 A | 9/1993 | Schultz et al. |
| 5,250,109 A | 10/1993 | Chan et al. |
| 5,254,429 A | 10/1993 | Gracia et al. |
| 5,256,193 A | 10/1993 | Winnik et al. |
| 5,258,274 A | 11/1993 | Helland et al. |
| 5,261,953 A | 11/1993 | Vieira et al. |
| 5,262,276 A | 11/1993 | Kawamura |
| 5,268,027 A | 12/1993 | Chan et al. |
| 5,270,078 A | 12/1993 | Walker et al. |
| 5,271,764 A | 12/1993 | Winnik et al. |
| 5,271,765 A | 12/1993 | Ma |
| 5,272,201 A | 12/1993 | Ma et al. |
| 5,275,646 A | 1/1994 | Marshall et al. |
| 5,279,652 A | 1/1994 | Kaufmann et al. |
| 5,282,894 A | 2/1994 | Albert et al. |
| 5,284,734 A | 2/1994 | Blum et al. |
| 5,286,286 A | 2/1994 | Winnik et al. |
| 5,286,288 A | 2/1994 | Tobias et al. |
| 5,294,528 A | 3/1994 | Furutachi |
| 5,296,275 A | 3/1994 | Goman et al. |
| 5,296,556 A | 3/1994 | Frihart |
| 5,298,030 A | 3/1994 | Burdeska et al. |
| 5,300,403 A | 4/1994 | Angelopulos et al. |
| 5,300,654 A | 4/1994 | Nakajima et al. |
| 5,302,195 A | 4/1994 | Helbrecht |
| 5,302,197 A | 4/1994 | Wickramanayke et al. |
| 5,310,778 A | 5/1994 | Shor et al. |
| 5,312,713 A | 5/1994 | Yokoyama et al. |
| 5,312,721 A | 5/1994 | Gesign |
| 5,324,349 A | 6/1994 | Sano et al. |
| 5,328,504 A | 7/1994 | Ohnishi |
| 5,330,860 A | 7/1994 | Grot et al. |
| 5,334,455 A | 8/1994 | Noren et al. |
| 5,338,319 A | 8/1994 | Kaschig et al. |
| 5,340,631 A | 8/1994 | Matsuzawa et al. |
| 5,340,854 A | 8/1994 | Martic et al. |
| 5,344,483 A | 9/1994 | Hinton |
| 5,356,464 A | 10/1994 | Hickman et al. |
| 5,362,592 A | 11/1994 | Murofushi et al. |
| 5,362,916 A | 11/1994 | Edwards et al. |
| 5,368,689 A | 11/1994 | Agnemo |
| 5,372,387 A | 12/1994 | Wajda |
| 5,372,917 A | 12/1994 | Tsuchida et al. |
| 5,374,335 A | 12/1994 | Lindgren et al. |
| 5,376,503 A | 12/1994 | Audett et al. |
| 5,383,961 A | 1/1995 | Bauer et al. |
| 5,384,186 A | 1/1995 | Trinh |
| 5,393,580 A | 2/1995 | Ma et al. |
| 5,401,303 A | 3/1995 | Stoffel et al. |
| 5,401,562 A | 3/1995 | Akao |
| 5,407,969 A | 4/1995 | Kleiner et al. |
| 5,415,686 A | 5/1995 | Kurabayashi et al. |
| 5,415,976 A | 5/1995 | Ali |
| 5,424,407 A | 6/1995 | Tanaka et al. |
| 5,425,978 A | 6/1995 | Berneth et al. |
| 5,426,164 A | 6/1995 | Babb et al. |
| 5,427,415 A | 6/1995 | Chang |
| 5,429,628 A | 7/1995 | Trinh et al. |
| 5,431,720 A | 7/1995 | Nagai et al. |
| 5,432,274 A | 7/1995 | Luong et al. |
| 5,445,651 A | 8/1995 | Thoen et al. |
| 5,445,842 A | 8/1995 | Tanaka et al. |
| 5,455,074 A | 10/1995 | Nohr et al. |

| | | | |
|---|---|---|---|
| 5,455,143 A | 10/1995 | Ali | |
| 5,459,014 A | 10/1995 | Nishijima et al. | |
| 5,464,472 A | 11/1995 | Horn et al. | |
| 5,466,283 A | 11/1995 | Kundo et al. | |
| 5,474,691 A | 12/1995 | Severns | |
| 5,475,080 A | 12/1995 | Gruber et al. | |
| 5,476,540 A | 12/1995 | Shields et al. | |
| 5,479,949 A | 1/1996 | Battard et al. | |
| 5,489,503 A | 2/1996 | Toan | |
| 5,498,345 A | 3/1996 | Jollenbeck et al. | |
| 5,501,774 A | 3/1996 | Burke | |
| 5,501,902 A | 3/1996 | Kronzer | |
| 5,503,664 A | 4/1996 | Sano et al. | |
| 5,509,957 A | 4/1996 | Toan et al. | |
| 5,531,821 A | 7/1996 | Wu | |
| 5,532,112 A | 7/1996 | Kohler et al. | |
| 5,541,633 A | 7/1996 | Winnik et al. | |
| 5,543,459 A | 8/1996 | Hartmann et al. | |
| 5,569,529 A | 10/1996 | Becker et al. | |
| 5,571,313 A | 11/1996 | Mafune et al. | |
| 5,575,891 A | 11/1996 | Trokhan et al. | |
| 5,580,369 A | 12/1996 | Belding et al. | |
| 5,591,489 A | 1/1997 | Dragner et al. | |
| 5,597,405 A | 1/1997 | Grigoryan et al. | |
| 5,607,803 A | 3/1997 | Murofushi et al. | |
| 5,616,443 A | 4/1997 | Nohr et al. | |
| 5,635,297 A | 6/1997 | Ogawa et al. | |
| 5,643,356 A | 7/1997 | Nohr et al. | |
| 5,643,631 A | 7/1997 | Donigian et al. | |
| 5,643,701 A | 7/1997 | Nohr et al. | |
| 5,645,964 A | 7/1997 | Nohr et al. | |
| 5,672,392 A | 9/1997 | De Clercq et al. | |
| 5,681,380 A | 10/1997 | Nohr et al. | |
| 5,683,843 A | 11/1997 | Nohr et al. | |
| 5,685,754 A | 11/1997 | Nohr et al. | |
| 5,686,503 A | 11/1997 | Nohr et al. | |
| 5,700,582 A | 12/1997 | Sargeant et al. | |
| 5,700,850 A | 12/1997 | Nohr et al. | |
| 5,705,247 A | 1/1998 | Arai et al. | |
| 5,709,955 A | 1/1998 | Nohr et al. | |
| 5,709,976 A | 1/1998 | Malhotra | |
| 5,721,287 A | 2/1998 | Nohr et al. | |
| 5,733,693 A | 3/1998 | Nohr et al. | |
| 5,738,932 A | 4/1998 | Kondo et al. | |
| 5,739,175 A | 4/1998 | Nohr et al. | |
| 5,747,550 A | 5/1998 | Nohr et al. | |
| 5,773,182 A | 6/1998 | Nohr et al. | |
| 5,782,963 A | 7/1998 | Nohr et al. | |
| 5,786,132 A | 7/1998 | Nohr et al. | |
| 5,798,015 A | 8/1998 | Nohr et al. | |
| 5,811,199 A | 9/1998 | MacDonald et al. | |
| 5,837,429 A | 11/1998 | Nohr et al. | |
| 5,849,411 A | 12/1998 | Nohr et al. | |
| 5,855,655 A | 1/1999 | Nohr et al. | |
| 5,856,515 A | 1/1999 | Therien et al. | |
| 5,865,471 A | 2/1999 | Nohr et al. | |
| 5,883,161 A | 3/1999 | Wood et al. | |
| 5,885,337 A | 3/1999 | Nohr et al. | |
| 5,891,229 A | 4/1999 | Nohr et al. | |
| 5,911,855 A | 6/1999 | Dransmann et al. | |
| 6,022,906 A | 2/2000 | Ohwa et al. | |
| 6,099,628 A * | 8/2000 | Nohr et al. | 106/31.49 |
| 6,168,654 B1 * | 1/2001 | Nohr et al. | 106/31.49 |
| 6,368,396 B1 * | 4/2002 | Nohr et al. | 106/31.49 |

FOREIGN PATENT DOCUMENTS

| | | |
|---|---|---|
| BE | 637169 | 3/1964 |
| CA | 413257 | 10/1932 |
| CA | 458808 | 12/1936 |
| CA | 461082 | 11/1948 |
| CA | 460268 | 10/1949 |
| CA | 463021 | 2/1950 |
| CA | 463022 | 2/1950 |
| CA | 465495 | 5/1950 |
| CA | 465496 | 5/1950 |
| CA | 465499 | 5/1950 |
| CA | 483214 | 5/1952 |
| CA | 517364 | 10/1955 |
| CA | 537687 | 3/1957 |
| CA | 552565 | 2/1958 |
| CA | 571792 | 3/1959 |
| CA | 779239 | 2/1968 |
| CA | 930103 | 7/1973 |
| CA | 2053094 | 4/1992 |
| CH | 603767 | 8/1978 |
| CH | 197808 | 5/1988 |
| CZ | 94118 | 5/1958 |
| DE | 1047787 | 12/1957 |
| DE | 1022801 | 1/1958 |
| DE | 1039835 | 9/1958 |
| DE | 1040562 | 10/1958 |
| DE | 1045414 | 12/1958 |
| DE | 1047013 | 12/1958 |
| DE | 1132540 | 7/1962 |
| DE | 1154069 | 9/1963 |
| DE | 1240811 | 5/1967 |
| DE | 2202497 | 8/1972 |
| DE | 2432563 | 2/1975 |
| DE | 2437380 | 2/1975 |
| DE | 2444520 | 3/1975 |
| DE | 2416259 | 10/1975 |
| DE | 2714978 | 10/1977 |
| DE | 2722264 | 11/1978 |
| DE | 158237 | 1/1983 |
| DE | 3126433 | 1/1983 |
| DE | 3415033 | 10/1984 |
| DE | 271512 | 9/1989 |
| DE | 3921600 | 1/1990 |
| DE | 3833437 | 4/1990 |
| DE | 3833438 | 4/1990 |
| DE | 004036328 | 7/1991 |
| DE | 4132288 | 4/1992 |
| DE | 4126461 | 2/1993 |
| EP | 0003884 | 9/1979 |
| EP | 0029284 | 5/1981 |
| EP | 0127574 | 12/1984 |
| EP | 0202803 | 11/1986 |
| EP | 0 209 831 | 1/1987 |
| EP | 0223587 | 5/1987 |
| EP | 0262533 | 4/1988 |
| EP | 0280458 | 8/1988 |
| EP | 0 303 803 | 2/1989 |
| EP | 0308274 | 3/1989 |
| EP | 0351615 | 1/1990 |
| EP | 0371304 | 6/1990 |
| EP | 0373662 | 6/1990 |
| EP | 0375160 | 6/1990 |
| EP | 0390439 | 10/1990 |
| EP | 0433201 | 6/1991 |
| EP | 0458140 | 10/1991 |
| EP | 0458140 | 11/1991 |
| EP | 0468465 | 1/1992 |
| EP | 0 469 595 | 2/1992 |
| EP | 0 475 075 | 3/1992 |
| EP | 0542286 | 5/1993 |
| EP | 000571190 | 11/1993 |
| EP | 0 605 840 | 7/1994 |
| EP | 0608433 | 8/1994 |
| EP | 0609159 | 8/1994 |
| EP | 0 635 380 | 1/1995 |
| EP | 0639664 | 2/1995 |
| EP | 0658607 | 6/1995 |

| | | | | | |
|---|---|---|---|---|---|
| EP | 0 673 779 | 9/1995 | JP | 627703 | 1/1987 |
| EP | 0694594 | 1/1996 | JP | 62-97881 | 5/1987 |
| EP | 0 716 929 | 6/1996 | JP | 62-100557 | 5/1987 |
| EP | 0 737 592 | 10/1996 | JP | 62127281 | 6/1987 |
| EP | 0755984 | 1/1997 | JP | 63-43959 | 2/1988 |
| EP | 0 805 152 | 11/1997 | JP | 63-48370 | 3/1988 |
| EP | 0 861 880 | 9/1998 | JP | 6395439 | 4/1988 |
| EP | 0878482 | 11/1998 | JP | 6395440 | 4/1988 |
| FR | 2245010 | 4/1975 | JP | 6395445 | 4/1988 |
| FR | 2383157 | 10/1978 | JP | 6395446 | 4/1988 |
| GB | 275245 | 10/1928 | JP | 6395447 | 4/1988 |
| GB | 349339 | 5/1931 | JP | 6395448 | 4/1988 |
| GB | 355686 | 8/1931 | JP | 6395449 | 4/1988 |
| GB | 399753 | 10/1933 | JP | 6395450 | 4/1988 |
| GB | 441085 | 1/1936 | JP | 63151946 | 6/1988 |
| GB | 463515 | 4/1937 | JP | 63-164953 | 7/1988 |
| GB | 492711 | 9/1938 | JP | 63-165498 | 7/1988 |
| GB | 518612 | 3/1940 | JP | 63-223077 | 9/1988 |
| GB | 539912 | 9/1941 | JP | 63-223078 | 9/1988 |
| GB | 626727 | 7/1947 | JP | 63-243101 | 10/1988 |
| GB | 600451 | 4/1948 | JP | 63-199781 | 12/1988 |
| GB | 616362 | 1/1949 | JP | 64-15049 | 1/1989 |
| GB | 618616 | 2/1949 | JP | 6429337 | 1/1989 |
| GB | 779389 | 7/1957 | JP | 64-40948 | 2/1989 |
| GB | 1150987 | 5/1969 | JP | 89014948 | 3/1989 |
| GB | 1372884 | 11/1974 | JP | 1-128063 | 5/1989 |
| GB | 2146357 | 4/1985 | JP | 1146974 | 6/1989 |
| IT | 662500 | 4/1964 | JP | 01210477 | 8/1989 |
| JP | 424756 | 2/1967 | JP | 1288854 | 11/1989 |
| JP | 4315663 | 7/1968 | JP | 2-58573 | 2/1990 |
| JP | 4726653 | 7/1972 | JP | 292957 | 4/1990 |
| JP | 4745409 | 11/1972 | JP | 2179642 | 7/1990 |
| JP | 49-8909 | 2/1974 | JP | 2282261 | 11/1990 |
| JP | 5065592 | 6/1975 | JP | 3-134072 | 6/1991 |
| JP | 51-17802 | 2/1976 | JP | 03163566 | 7/1991 |
| JP | 53-104321 | 9/1978 | JP | 3-170415 | 7/1991 |
| JP | 55-62059 | 5/1980 | JP | 3-206439 | 9/1991 |
| JP | 55-90506 | 7/1980 | JP | 3-258867 | 11/1991 |
| JP | 56-8134 | 1/1981 | JP | 3-203694 | 12/1991 |
| JP | 0014233 | 2/1981 | JP | 3284668 | 12/1991 |
| JP | 5614569 | 2/1981 | JP | 4023884 | 1/1992 |
| JP | 56-24472 | 3/1981 | JP | 4023885 | 1/1992 |
| JP | 56-36556 | 4/1981 | JP | 4-45174 | 2/1992 |
| JP | 5761055 | 4/1982 | JP | 4100801 | 4/1992 |
| JP | 57128283 | 8/1982 | JP | 4-136075 | 5/1992 |
| JP | 57171775 | 10/1982 | JP | 04356087 | 12/1992 |
| JP | 58-124452 | 7/1983 | JP | 543806 | 2/1993 |
| JP | 58-125770 | 7/1983 | JP | 561220 | 3/1993 |
| JP | 58-222164 | 12/1983 | JP | 5080506 | 4/1993 |
| JP | 5989360 | 5/1984 | JP | 05119506 | 5/1993 |
| JP | 29219270 | 12/1984 | JP | 5134447 | 5/1993 |
| JP | 59-219270 | 4/1985 | JP | 5-140498 | 6/1993 |
| JP | 60-192729 | 10/1985 | JP | 2-219869 | 9/1993 |
| JP | 60239739 | 11/1985 | JP | 5263067 | 10/1993 |
| JP | 60239740 | 11/1985 | JP | 680915 | 3/1994 |
| JP | 60239741 | 11/1985 | JP | 6116555 | 4/1994 |
| JP | 60239743 | 11/1985 | JP | 6116556 | 4/1994 |
| JP | 61-288 | 1/1986 | JP | 6116557 | 4/1994 |
| JP | 613781 | 1/1986 | JP | 6-175584 | 6/1994 |
| JP | 61-14994 | 1/1986 | JP | 6214339 | 8/1994 |
| JP | 61-14995 | 1/1986 | JP | 6256494 | 9/1994 |
| JP | 61-21184 | 1/1986 | JP | 6256633 | 9/1994 |
| JP | 61-25885 | 2/1986 | NL | 7113828 | 4/1972 |
| JP | 61-30592 | 2/1986 | RU | 1310767 | 5/1987 |
| JP | 61-40366 | 2/1986 | RU | 1772118 | 10/1992 |
| JP | 61-77846 | 4/1986 | WO | WO 92/11295 | 7/1992 |
| JP | 61-128973 | 6/1986 | WO | WO 93/06597 | 4/1993 |
| JP | 61-97025 | 9/1986 | WO | WO 94/01503 | 1/1994 |
| JP | 61-222789 | 10/1986 | WO | WO 94/22500 | 10/1994 |
| JP | 61-247703 | 11/1986 | WO | WO 94/22501 | 10/1994 |
| JP | 61-285403 | 12/1986 | WO | WO 95/04955 | 2/1995 |

| WO | WO 95/28285 | 10/1995 |
| WO | WO 96/00740 | 1/1996 |
| WO | WO 96/19502 | 6/1996 |
| WO | WO 96/22335 | 7/1996 |
| WO | WO 96/24636 | 8/1996 |
| WO | WO 97/20000 | 6/1997 |
| WO | WO 97/35933 | 10/1997 |
| WO | WO 98/23695 | 6/1998 |
| WO | WO 99/36476 | 7/1999 |

OTHER PUBLICATIONS

Kubat et al., "Photophysical properties of metal complexes of meso–tetrakis (40sulphonatophenyl) prophyrin," *J. Photochem. and Photobiol.*, 96, pp. 93–97, Jan. 1, 1996.

Derwent World Patents, EP 659039 (Canon KK) Jun. 21, 1995. abstract.

Derwent World Patents, JP 7061114 (Dainippon Printing Co. Ltd.) Mar. 7, 1995. abstract.

Abstract for WO 95/00343–A1, *Textiles: Paper: Cellulose*, p. 7, Feb. 1, 1995.

Maki, Y. et al., "A novel heterocyclic N–oxide, pyrimido[5,4–g]pteridinetetrone 5–oxide, with multifunctional photo-oxidative properties" *Chemical Abstracts*, 122, p. 925 No., Jan. 1, 1995.

Patent Abstracts of Japan, JP 06200204 (Brother Ind Ltd), Jul. 19, 1994.

Abstract of patent, JP 6–80915 (Canon Inc.), Mar. 22, 1994.

Abstract of patent, JP 06–43573 (Iku Meji) (Feb. 18, 1994).

Wang et al., Effects of substituenta attached at benzaldehyde on the synthesis and properties of prophyrins, *Chem. Abstracts* 120(9), Jan. 31, 1994.

Pitchumani, K. et al., "Modification of chemical reactivity upon cyclodextrin encapsulation", *Chemical Abstracts*, 121, p. 982 No., Jan. 1, 1994.

Wijesekera, T.P., et al. Synthetic Aspects of Pophyrin and Metalloporphyrin Chemistry, *Metalloporpyrins in Catalytic Oxidations*, pp. 202–20, Jan. 1, 1994.

Derwent Publications Ltd., London, JP 05297627 (Fujitsu Ltd.), Nov. 12, 1993. (Astract).

Patent Abstracts of Japan, JP 5241369 (Bando Chem Ind Ltd et al.), Sep. 21, 1993. (Abstract).

Derwent Publications Ltd., London, JP 05232738 (Yamazaki, T.), Sep. 10, 1993. (Abstract).

Derwent Publications Ltd., London, EP 000559310 (Zeneca Ltd.), Sep. 8, 1993. (Abstract).

Derwent Publications Ltd., London, J,A, 5–230410 (Seiko Epson Corp), Sep. 7, 1993. (Abstract).

Derwent Publications Ltd., London, JP 5–230407 (Mitsubishi Kasei Corp), Sep. 7, 1993. (Abstract).

Abstract Of Patent, JP 405230410 (Seiko Epson Corp.), Sep. 7, 1993. (Abstract).

Abstract Of Patent, JP 405230407 (Mitsubishi Kasei Corp.), Sep. 7, 1993. (Abstract).

Patent Abstracts of Japan, JP 5197198 (Bando Chem Ind Ltd et al.), Aug. 6, 1993. (Abstract).

Database WPI–Derwent Publications Ltd., London, J,A, 5197069 (Bando Chem), Aug. 6, 1993.

Abstract of Patent, JP 5–195450 (Nitto Boseki Co. Ltd), Aug. 3, 1993.

Derwent World Patents, JP 5186725 (Seiko Epson Corp.), Jul. 27, 1993 abstract.

Patent Abstracts of Japan, JP 5181308 (Bando Chem Ind Ltd et al.), Jul. 23, 1993. (Abstract).

Patent Abstracts of Japan, JP 5181310 (Bando Chem Ind Ltd et al.), Jul. 23, 1993. (Abstract).

Derwent Publications Ltd., London, JP 5–132638 (Mitsubishi Kasei Corp), May 28, 1993, (Abstract).

Abstract Of Patent, JP 405132638 (Mitsubishi Kasei Corp.), May 28, 1993, (Abstract).

Derwent Publications Ltd., London, JP 5–125318 (Mitsubishi Kasei Corp), May 21, 1993, (Abstract).

Abstract Of Patent, JP 405125318 (Mitsubishi Kasei Corp.), May 21, 1993, (Abstract).

Abstract of patent, JP 05–117200 (Hidefumi Hirai et al.) (May 14, 1993).

Derwent World Patents Index, JP 5117105 (Mitsui Toatsu Chem Inc.) May 14, 1993.

Derwent Publications Ltd., London, JP 05061246 (Ricoh KK), Mar. 12, 1993. (Abstract).

Husain, N. et al., "Cyclodextrins as mobile–phase additives in reversed–phase HPLC" *American Laboratory*, 82, pp. 80–87, Jan. 1, 1993.

Hamilton, D.P. "Tired of Shredding? New Ricoh Method Tries Different Tack" *Wall Street Journal*, p. B2, Jan. 1, 1993.

"Cyclodextrins: A Breakthrough for Molecular Encapsulation," *American Maize Products Co. (AMAIZO)*, Jan. 1, 1993.

Duxbury, "The Photochemistry and Photophysics of Triphenylmethane Dyes in Solid Liquid Media" *Chemical Review*, 93, pp. 381–433, Jan. 1, 1993.

Abstract of patent, JP 04–351603 (Dec. 7, 1992).

Abstract of patent, JP 04–351602, Dec. 7, 1992.

Derwent Publications Ltd., London, JP 404314769 (Citizen Watch Co. Ltd.), Nov. 5, 1992. (Abstract).

Abstract of patent, JP 04315739, Nov. 3, 1992.

Derwent Publications Ltd., London, JP 04300395 (Funai Denki KK), Oct. 23, 1992.

Derwent Publications Ltd., London, JP 404213374 (Mitsubishi Kasei Corp), Aug. 4, 1992. (Abstract).

Abstract of patent, JP 04–210228, Jul. 31, 1992.

Abstract Of Patent, JP 404202571 (Canon Inc.), Jul. 23, 1992. (Abstract).

Abstract Of Patent, JP 404202271 (Mitsubishi Kasei Corp.), Jul. 23, 1992, (Abstract).

Derwent WPI, JP 4–197657 (Toshiba KK) Jul. 17, 1992, abstract.

Derwent Publications Ltd., London, JP 4–189877 (Seiko Epson Corp), Jul. 8, 1992. (Abstract).

Derwent Publications Ltd., London, JP 404189876 (Seiko Epson Corp), Jul. 8, 1992, (Abstract).

Abstract Of Patent, JP 404189877 (Seiko Epson Corp.), Jul. 8, 1992. (Abstract).

Derwent Publications Ltd., London, J,A, 4–170479 (Seiko Epson Corp), Jun. 18, 1992, (Abstract).

Abstract of patent, JP 04–81402, Mar. 16, 1992.

Abstract of patent, JP 04–81401, Mar. 16, 1992.

Kogelschatz, "Silent–discharge driven excimer UV sources and their applications" *Applied Surface Science* pp. 410–423, Jan. 1, 1992.

Patent Abstracts of Japan, JP 03295653 (Matsushita Electric Works Ltd.), Dec. 26, 1991.

Derwent Publications, Ltd., London, JP 403269167 (Japan Wool Textile KK), Nov. 29, 1991, (Abstract).

Derwent Publications Ltd., London, JO 3247676 (Canon KK), Nov. 5, 1991 (Abstract).

Tang, F., Synthesis and Properties of 5, 10, 15, 20–tetrakis (4=methoxyl–3–sulfophenyl) porphine, *Chem. Abstracts*, 115(17), Oct. 20, 1991.

Abstract of patent, JP 03–220384, Sep. 27, 1991.
Patent Abstracts of Japan, JP 03184896 (Dainippon Printing Co Ltd.) Aug. 12, 1991.
Derwent Publications Ltd., London, JP 3167270 (Mitsubishi Kasei Corp), Jul. 19, 1991, (Abstract).
Derwent Publications Ltd., London, JO 3167270 (Mitsubishi Kasei Corp.), Jul. 19, 1991 (Abstract).
Derwent World Patents, EP 435536 (Canon KK) Jul. 3, 1991. abstract.
Derwent Publications Ltd., London, JO 3093870 (Dainippon Ink Chem KK.), Apr. 18, 1991 (Abstract).
Abstract of patent, JP 06369890, Mar. 18, 1991.
Kogelschatz U. et al., "New Excimer UV Sources for Industrial Applications," *ABB Review,* 391, pp. 1–10, Mar. 1, 1991.
Abstract of patent, JP 03–41165, Feb. 21, 1991.
"Coloring/Decoloring Agent for Tonor Use Developed," *Japan Chemical Week,* Jan. 1, 1991.
Braithwaite, M., et al., "Formulation" *Chemistry & Technology of UV & EB Formulation for Coatings, Inks & Paints,* IV, pp. 11–12, Jan. 1, 1991.
*Scientific Polymer Products, Inc. Brochure* pp. 24–31, Jan. 1, 1991.
Dietliker, K. "Photoiniators for Free Radical and Catioinc Polymerisation" *Chemistry & of UV & EB Formulation for Coatings, Inks & Paints,* III, pp. 61, 63, 229–23, Jan. 1, 1991.
Esrom et al., "Large area Photochemical Dry Etching of Polymers iwth Incoherent Excimer UV Radiation," *MRS Materials Research Society,* pp. 1–7, Jan. 1, 1991.
Esrom et al., Excimer Laser–Induced Decomposition of Aluminum Nitride, *Materials Research Society Fall Meeting,* pp. 1–6, Jan. 1, 1991.
Esrom et al., "Metal deposition with a windowless VUV excimer source" *Applied Surface Science,* pp. 1–5, Jan. 1, 1991.
Esrom, "Excimer Laser–Induced Surface Activation of Aln for Electroless Metal Deposition" *Mat. Res. Sco.ISymp. Proc.* 204, pp. 457–465, Jan. 1, 1991.
Zhang et al., "UV–induced decompositin of adsorbed Cu–acetylacetonate films at room temperature for electroless metal plating" *Applied Surface Science* pp. 1–6, Jan. 1, 1991.
"Coloring/Decoloring Agent for Tonor Use Developed" *Japan Chemical Week,* Jan. 1, 1991.
"German company develops reuseable paper" *Pulp & Paper* Jan. 1, 1991.
Abstract of patent, JP 2289652, Nov. 29, 1990.
Ohashi et al., "Molecular Mechanics Studies on Inclusion Compounds of Cyanine Dye Monomers and Dimers in Cyclodextrin Cavities," *J. Am. Chem. Soc.* 112, pp. 5824–5830, Nov. 15, 1990.
Kogelschatz et al., "New Incoherent Ultraviolet Excimer Sources for Photolytic Material Deposition," *Laser Und Optoelektronik,* Aug. 4, 1990.
Patent Abstracts of Japan, JP 02141287 (Dainippon Printing Co Ltd.) May 30, 1990.
Abstract of Patent, JP 0297957, (Fuji Xerox Co., Ltd.), Apr. 10, 1990.
Derwent Publications Ltd., London, JP 2091166 (Canon KK), Mar. 30, 1990. (Abstract).
Zhang, Zhoupeng, Synthesis of 7 meso–tetrasubstituted porphyrins, *Chem. Abstracts,* 113(9), Mar. 27, 1990.

Esrom et al., "Metal Deposition with Incoherent Excimer Radiation" *Mat. Res. Soc. Symp. Proc.* 158, pp. 189–198, Jan. 1, 1990.
Esrom, "UV Excimer Laser–Induced Deposition of Palladium from palladiym Acetate Films" *Mat. Res. Soc. Symp. Proc.* 158, pp. 109–117, Jan. 1, 1990.
Kogelschatz, U. "Silent Discharges for the Generation of ultraviolet and vacuum ultraviolet excimer radiation," *Pure & Applied Chem.,* 62, pp. 1667–74, Jan. 1, 1990.
Esrom et al., "Investigation of the mechanism of the UV–induced palladium depostions processf from thin solid palladium acetate films" *Applied Surface Science,* 46, pp. 158–162, Jan. 1, 1990.
Zhang et al., "VUV synchrotron radiation processing of thin palladium acetate spin–on films for metallic surface patterning" *Applied Surface Science,* 46, pp. 153–157, Jan. 1, 1990.
Brennan et al., "Stereoelectronic effects in ring closure reactions: the 2'–hydroxychalcone—flavanone equilibrium, and related systems," *Canadian J. Chem.* 68(10) pp. 1780–, Jan. 1, 1990.
Abstract of patent, JP 01–299083, Dec. 1, 1989.
Derwent Publications Ltd., London, J,O, 1182379 (Canon KK), Jul. 20, 1989. (Abstract).
Derwent Publications Ltd., London, JO 1011171 (Mitsubishi Chem Ind. KK.), Jan. 13, 1989 (Abstract).
Gruber, R.J., et al., "Xerographic Materials" *Encyclopedia of Polymer Science and Engineering,* 17, pp. 918–943, Jan. 1, 1989.
Pappas, S.P. "Photocrosslinking" *Comph. Pol. Sci.,* 6, pp. 135–148, Jan. 1, 1989.
Pappas, S.P. "Photoinitiated Polymerization" *Comph. Pol. Sci.,* 4, pp. 337–355, Jan. 1, 1989.
Kirilenko, G.V. et al., "An analog of the vesicular process with amplitude modulation of the incident light beam" *Chemical Abstracts,* 111, p. 569 No., Jan. 1, 1989.
Esrom et al., "UV excimer laser–induced pre–nucleation of surfaces followed by electroless metallization ", *Chemtronics,* 4, pp. 216–223, Jan. 1, 1989.
Esrom et al., "VUV light–induced depostion of palladium using an incoherent Xe2* excimer source" *Chemtronics,* 4, Jan. 1, 1989.
Esrom et al., "UV Light–Induced Deposition of Copper Films," pp. C5–719, Jan. 1, 1989.
Falbe et al., *Rompp Chemie Lexikon,* 9, p. 270, Jan. 1, 1989.
Allen, Norman S., *Photopolymerisation and Photoimaging Science and Technology,* pp. 188–19, Jan. 1, 1989.
Lindsey, J.S. et al., Investigation of the Synthesis of Ortho–Substituted Tetraphenylporphyrins, *J. Org. Chem.* 54, pp. 828–83, Jan. 1, 1989.
Patent Abstracts of Japan, JP 63297477 (Fuji Photo Film Co. Ltd.) Dec. 5, 1988, abstract.
Derwent Publications, Ltd., London, SU 1423656 (Kherson Ind Inst), Sep. 15, 1988 (Abstract).
Derwent Publication, Ltd., London, EP 0280653 (Ciba GeigyAG), Aug. 31, 1988 (Abstract).
Abstract of patent, JP 63–190815, Aug. 8, 1988.
Patent Abstracts of Japan, JP 63179985 (Tomoegawa Paper Co. Ltd.), Jul. 23, 1988.
Derwent World Patents Index, JP 63179977 (Tomoegawa Paper Mfg Co Ltd), Jul. 23, 1988.
Furcone, S.Y. et al., "Spin–on Bl4Sr3Ca3Cu4O16+x superconducting thin films from citrate precursors," *Appl. Phys. Lett.* 52(25) 2180–2182, Jun. 20, 1988.
Abstract of patent, JP 63–144329, Jun. 16, 1988.

Abstract of patent, JP 63–130164, Jun. 2, 1988.
Derwent Publications, Ltd., London, J6 3112770 (Toray Ind Inc), May 17, 1988 (Abstract).
Derwent Publications, Ltd., London, J6 3108074 (Konishiroku Photo KK), May 12, 1988 (Abstract).
Derwent Publications, Ltd., London, J6 3108073 (Konishiroku Photo KK), May 12, 1988 (Abstract).
Abstract of patent, JP 61–77846, Apr. 21, 1988.
Abstract of patent, JP 63–73241, Apr. 2, 1988.
Patent Abstracts of Japan, JP 63062738 (Seiko Epson Corp), Mar. 19, 1988.
Abstract of patent, JP 63–47762, Feb. 29, 1988.
Abstract of patent, JP 63–47763, Feb. 29, 1988.
Abstract of patent, JP 63–47764, Feb. 29, 1988.
Abstract of patent, JP 63–47765, Feb. 29, 1988.
Eliasson, B., et al., "UV Excimer Radiation from Dieletric–Barrier Discharges" *Applied Physics B,* 46, pp. 299–303, Jan. 1, 1988.
Eliasson et al., "New Trends in High Intensity UV Generation" *EPA Newsletter,* (32), pp. 29–40, Jan. 1, 1988.
Cotton, F.A. "Oxygen: Group Via(16)," *Advanced Inorganic Chemistry* 5th ed., pp. 473–474, Jan. 1, 1988.
Derwent Publications, Ltd., London, J6 2270665 (Konishiroku Photo KK) (Abstract), Nov. 25, 1987.
Abstract of patent, JP 62–215261, Sep. 21, 1987.
Derwent World Patents, JP 62064874 (Dainichiseika Color & Chem Mfg.), Mar. 23, 1987. abstract.
Derwent World Patents, JP 62064874 (Dainichiseika Color & Chem Mfg.), Mar. 23, 1987. abstract.
Database EPI, Derwent Publications Ltd., London, JP 62032082 (Mitsubishi Denki KK), Feb. 12, 1987. (Abstract).
Abstract of patent, JP 62–32082, Feb. 12, 1987.
Derwent Publications Ltd., London, J6 2007772 (ALPS Electric KK.), Jan. 14, 1987 (Abstract).
Gross et al., "Laser direct–write metallization in thin palladium acetate films" *J. App. Phys.,* 61(4) pp. 1628–1632, Jan. 1, 1987.
Al–Ismail et al., "Some experimental results on thin polypropylene films loaded with finely–dispersed copper," *Journal of Materials Science,* pp. 415–418, Jan. 1, 1987.
Baufay et al., "Optical self–regulation during laser–induced oxidation of copper," *J. Appl. Phys,* 61(9) pp. 4640–4651, Jan. 1, 1987.
Lindsey, J.S. et al., Rothemund and Adler–Longo Reactions Revisited: Synthesis of Tetraphenylporphyrins under Equilibrium Conditions, *J. Org. Chem.* 52, pp. 827–83, Jan. 1, 1987.
Derwent Publications Ltd., London, JA 0284478 (Sanyo Chem Ind Ltd.), Dec. 15, 1986 (Abstract).
Abstract of patent, JP 61251842, Nov. 8, 1986.
Database WPI, Derwent Publications Ltd., London, GB; SU, A, 1098210 (Kutulya L A) Jun. 23, 1986.
Abstract of patent, JP 61–97025, May 15, 1986.
Abstract of patent, JP 61–87760, May 6, 1986.
Derwent Publications Ltd., London, DL 0234731 (Karl Marx Univ. Leipzig), Apr. 9, 1986. (Abstract).
Derwent World Patents Index, SU 1219612 (AS USSR NON–AQ SOLN) Mar. 23, 1986.
Derwent Publications Ltd., London, J6 1041381 (Osaka Prefecture), Feb. 27, 1986 (Abstract).
Dialog, JAPIO, JP 61–034057 (Ciba Geigy AG) Feb. 18, 1986.
Derwent World Patents Index, JP 61027288 (Sumitomo Chem Ind KK) Feb. 6, 1986.
Sakai et al., "A Novel and Practical Synthetic Method of 3(2H)–Furanone Derivatives," *J. Heterocyclie Chem.,* 23, pp. 1199–, Jan. 1, 1986.
Jellinek, H.H.G. et al., "Evolution of H20 and CO2 During the Copper–Catalyzed Oxidation of Isotactic Polypropylene," *J. Polymer Sci.,* 24, pp. 389–403, Jan. 1, 1986.
Jellinek, H.H.G. et al., "Diffusion of Ca2+ Catalysts from Cu–Metal Polymer of Cu–Oxide/Polymer Interfaces into Isotactic Polypropylene," *J. Polymer Sci.,* 24, 503–510, Jan. 1, 1986.
John J. Eisch and Ramiro Sanchez, "Selective, Oxophilic Imination of Ketones with Bis (dichloroaluminum) Phenylimide" *J. Org. Chem.* 51(10), pp. 1848–1852, Jan. 1, 1986.
Derwent Publications Ltd., London, J6 0226575 (Sumitomo Chem Ind Ltd.), Oct. 11, 1985 (Abstract).
Abstract of patent, JP 60–156761, Aug. 16, 1985.
Derwent World Patents, DE 3443565 (Mitsubishi Yuka Fine Che. et al.) Jul. 11, 1985, abstract.
Derwent Publications Ltd., London, J,A, 0011451 (Fugi Photo Film KK), Jan. 21, 1985. (Abstract).
Derwent Publications, Ltd., London J6 0011449–A (Taoka Chemical KK) Jan. 21, 1985 (abstract).
Derwent World Patents, JP 60–008088 (Mitsubishi Paper Mills Ltd.) Jan. 16, 1985. abstract.
Roos, G. et al., "Textile applications of photocrosslinkable polymers" *Chemical Abstracts* 103, pp. 57 No. 10323, Jan. 1, 1985.
Beck, M.T., et al., Mechanism of the autophotosensitezed formulation of prophyrins in the reaction of pyrrole and m–disulfonated benzaldehyde, *Chemical Abstracts,* 1985:4 53624, Jan. 1, 1985.
Derwent World Patents Index, EP 127574 (Ciba Geigy AG), Dec. 5, 1984.
Derwent Publications Ltd., London, JP 0198187 (Canon KK), Nov. 9, 1984. (Abstract).
Derwent Publications Ltd., London, J,A, 0169883 (Ricoh KK), Sep. 25, 1984. (Abstract).
Derwent Publications Ltd., London, JA 0169883 (Ricoh KK), Sep. 25, 1984 (Abstract).
Derwent Publications Ltd., London, JA 0198187 (Canon KK), Nov. 9, 1984 (Abstract).
Derwent Publications Ltd., London, J,A, 0053563 (Dainippon Toryo KK), Mar. 28, 1984. (Abstract).
Derwent Publications Ltd., London, J,A, 0053562 (Dainippon Toryo KK), Mar. 28, 1984. (Abstract).
Derwent Publications Ltd., London, J,A, 0053562 (Dainippon Toryo KK), Mar. 28, 1984. (Abstract).
Abstract of Patent, JA 0053563 (Dainippon Toryo KK), Mar. 28, 1984, (Abstract).
Abstract of Patent, JA 0053562 (Dainippon Toryo KK), Mar. 28, 1984, (Abstract).
Derwent Publications Ltd., London J,A, 0051961 (Dainippon Toryo KK), Mar. 26, 1984). (Abstract).
Abstract of Patent, JA 0051961 (Dainippon Toryo KK), Mar. 26, 1984 (Abstract).
Saenger, W. "Structural Aspect of Cyclodextrins and Their Inclusion Complexes" *Inclusion Compounds—Structural Aspects of Inclusion Compounds formed by Organic Host,*2, pp. 231–259, Jan. 1, 1984.

Szejtli, "Industrial Applications of Cyclodextrins" *Inclusion Compounds: Physical Prop. & Applns* 3, pp. 331–390, Jan. 1, 1984.

Kano et al., "Three–Component Complexes of Cyclodextrins. Exciplex Formation in Cyclodextrin Cavity," *J. Inclusion Phenomena* 2 pp. 737–Jan. 1, 1984.

Suzuki et al., "Spectroscopic Investigation of Cyclodextrin Monomers, Derivatives, Polymers and Azo Dyes," *J. Inclusion Phenomena* 2, pp. 715–Jan. 1, 1984.

Abstract of Patent, JA 0222164 (Richo KK), Dec. 23, 1983 (Abstract).

Abstract of patent, JP 58211426 (Sekisui Plastics KK), (Dec. 8, 1983).

Derwent Publications, Ltd., London, EP 0072775 (Ciba Geigy AG), Feb. 23, 1983 (Abstract).

van Beek, H.C.A, "Light–Induced Colour Changes in Dyes and Materials" *Color Res. and Appl.*, 8, pp. 176–181, Jan. 1, 1983.

Connors, K.A., "Application of a stoichiometric model of cyclodextrin complex formation" *Chemical Abstracts*, 98, pp. 598 No., Jan. 1, 1983.

Abstract of Patent, EP 0065617 (IBM Corp.), Dec. 1, 1982 (Abstract).

Derwent Publications Ltd., London, J,A, 0187289 (Honshu Paper Mfg KK), Nov. 17, 1982. (Abstract).

Abstract of Patent, JA 0187289 (Honsho Paper Mfg. KK), Nov. 17, 1982 (Abstract).

Abstract of Patent, JA 0185364 (Ricoh KK), Nov. 15, 1982 (Abstract).

Derwent Publications, Ltd., London J5 7139146 (Showa Kako KK) Aug. 27, 1982 (abstract).

Abstract of Patent, JP 0090069 (Canon KK), Jun. 4, 1982 (Abstract).

Derwent Publications, Ltd., London, JA 0061785 (Nippon Senka KK), Apr. 14, 1982 (Abstract).

Fischer, "Submicroscopic contact imaging with visible light by energy transfer" *Appl. Phys. Letter*, 40(3), Feb. 1, 1982.

Abstract of Patent, JA 0010659 (Canon KK), Jan. 20, 192 (Abstract).

Abstract of Patent, JA 0010661 (Canon KK), Jan. 20, 1982, (Abstract).

Christen, "Carbonylverbindungen: Aldehyde und Ketone," *Grundlagen der Organischen Chemie*, p. 255, Jan. 1, 1982.

Derwent Publications Ltd., London, J,A, 0155263 (Canon KK), Dec. 1, 1981. (Abstract).

Abstract of Patent, JA 0155263 (Cano KK), Dec. 1, 1981 (Abstract).

Abstract of Patent, JA 0147861 (Canon KK), Nov. 17, 1981 (Abstract).

Derwent Publications Ltd., London, J,A, 0143273 (Canon KK), Nov. 7, 1981. (Abstract).

Abstract of Patent, JP 56143272 (Canon KK), Nov. 7, 1981 (Abstract).

Patent Abstracts of Japan, JP 56143274 (Canon Inc.) Nov. 7, 1981, abstract.

Patent Abstracts of Japan, JP 56143274 (Canon Inc.) Nov. 7, 1981, abstract.

Abstract of Patent, JA 0136861 (Canon KK), Oct. 26, 1981 (Abstract).

Abstract of Patent, JA 6133378 (Canon KK), Oct. 19, 1981 (Abstract).

Abstract of Patent, JA 6133377 (Canon KK), Oct. 19, 1981 (Abstract).

Abstract of Patent, JA 6093755 (Canon KK), Jul. 29, 1981 (Abstract).

Derwent Publications Ltd., London, J,A, 0008135 (Ricoh KK), Jan. 27, 1981. (Abstract).

Derwent Publications Ltd., London, J,A, 000488 (Canon KK), Dec. 17, 1981. (Abstract).*

Abstract of Patent, JA 0004488 (Canon KK), Jan. 17, 1981 (Abstract).*

Kirk–Othmer, "Metallic Coatings," *Encyclopedia of Chemical Technology*, 15, pp. 241–274, Jan. 1, 1981.*

Komiyama et al., "One–Pot Preparation of 4–Hydroxychalcone β–Cyclopdextrin as Catalyst," *Makromol. Chem.*, 2, pp. 733–734, Jan. 1, 1981.*

Derwent Publications, Ltd., London CA 1086–719 (Sherwood Medical) Sep. 30, 1980 (abstract).*

Derwent Publications Ltd., Database WPI, JP 55 113036 (Ricoh KK), Sep. 1, 1980.*

Rosanske et al., "Stoichiometric Model of Cyclodextrin Complex Formation," *Journal of Pharmaceutical Sciences*, 69(5), pp. 564–567, Jan. 1, 1980.*

Semple et al., "Synthesis of Functionalized Tetrahydrofurans," *Tetrahedron Letters*, 81, pp. 4561–, Jan. 1, 1980.*

Kirk–Othmer, "Film Deposition Techniques," *Encyclopedia of Chemical Technology*, 10, pp. 247–283, Jan. 1, 1980.*

Derwent World Patents Index, Derwent Info. Ltd., JP 54158941 (Toyo Pulp KK), Dec. 15, 1979. (Abstract).*

Derwent World Patents Index, JP 54117536 (Kawashima F) Sep. 12, 1979.*

Derwent Publications, Ltd., London J,A, 0005422 (Fuji Photo Film KK), Jan. 16, 1979. (Abstract).*

Drexhage et al., "Photo–bleachable dyes and processes" *Research Disclosure*, pp. 85–87, Jan. 1, 1979.*

"Color imaging devices and color filter arrays using photo–bleachable dyes," *Research Disclosure* pp. 22–23, Jan. 1, 1979.*

Wolff, N.E., et al., "Electrophotography," *Kirk–Othmer Encyclopedia of Chemical Technology*, 8, pp. 794–826, Jan. 1, 1979.*

Derwent Publications, Ltd., London J,A, 0012037 (Pentel KK), Jan. 29, 1977. (Abstract).*

Abstract Of Patent, JA 0012037 (Pentel KK), Jan. 29, 1977 (Abstract).*

Jenkins, P.W. et al., "Photobleachable dye material," *Research Disclosure*, pp. 18 [No. 12932], Jan. 1, 1975.*

Lamberts, R.L., "Recording color grid patterns with lenticules," *Research Disclosure*, pp. 18–19 No., Jan. 1, 1975.*

Karmanov, L.S. et al., "Light stabilizers of daytime fluorescent paints," *Chemical Abstracts*, 82, pp. 147 No., Jan. 1, 1975.

Prokopovich, B. et al, "Selection of effective photoinducers for rapid hardening of polyester varnish PE–250," *Chemical Abstracts*, 83, pp. 131 No., Jan. 1, 1975.

"Variable Contrast Printing System," *Research Disclosure*, pp. 19 [No. 12931], Jan. 1, 1975.

Lakshamn, "Electronic Absorption Spectrum of Copper Formate Tetrahydrate," *Chemical Physics Letters*, 31(2), pp. 331–334, Jan. 1, 1975.

Derwent Publications, Ltd., London J4 9131–226 (TNational Cash Register C) Dec. 16, 1974 (abstract).

Chang, I.F., et al., "Color Modulated Dye Ink Jet Printer," *IBM Technical Disclosure Bulletin*, 17(5), pp. 1520–1521, Oct. 1, 1974.

"Darocur 1173: Liquid Photoiniator for Ultraviolet Curing of Coatings," Jan. 1, 1974.

Hosokawa et al., "Ascofuranone, an antibiotic from Ascochyta," Japan Kokai 73 91,278 (Nov. 28, 1973), *Merck Index*, 80, p. 283, Jan. 1, 1974.

Abstract of patent, NL 7112489 (Dec. 27, 1971).

Gafney et al., "Photochemical Reactions of Copper (II)—1,3–Diketonate Complexes" *Journal of the Americqal Chemical Society*, Apr. 7, 1971.

Derwent Publications, Ltd., London SU 292698–S Jan. 15, 1971 (abstract).

Derwent World Patents Index, CS 120380 (Kocourek, Jan) Oct. 15, 1966.

Tsuda, K., et al., Vinyl Polymerization. CSLVI. The influence of dibenzoyl disulfide derivatives on radical polymerizations, *Chemical Abstract*, 1966:29198, Jan. 1, 1966.

R. T. Morrison & R.N. Boyd, *Organic Chemistry*, p. 174, Jan. 1, 1959.

Rigdon, J.E. "In Search of Paper that Spies Can't Copy," *Wall Street Journal*, No Date.

Chatterjee, S. et al., "Photochemistry of Carbocyanine Alkyltriphenylborate Salts: Intra–Ion–Pair Electron Transfer and the Chemistry of Boranyl Radicals," *J. Am. Chem. Soc.*, 112, pp. 6329–6338, No Date.

"Assay—Physical and Chemical Analysis of Complexes," *AMAIZO*, No Date.

"Cyclodextrin," *AMAIZO*, No Date.

"Beta Cyclodextrin Polymer (BCDP)," *AMAIZO*, No Date.

"Chemically Modified Cyclodextrins," *AMAIZO*, No Date.

"Cyclodextrin Complexation," *American Maize Products Co.*, No Date.

"Monomers," *Scientific Polymer Products Inc.*, No date.

Suppan, Paul, "Quenching of Excited States," *Chemistry and Light*, pp. 65–69, No date.

Yamaguchi, H. et al., "Supersensitization. Aromatic ketones as supersentizers," *Chemical Abstracts* 53, p. 107(d), No date.

Stecher, H. "Ultraviolet–absorptive additives in adhesives, lacquers, and plastics," *Chemical Abstracts*, 53, p. 14579(c), No date.

Maslennikov, A.S., "Coupling of diazonium salts with ketones," *Chemical Abstracts*, 60, p. 3128e, No date.

Derwent Publications Ltd., London, 4 9128022, No date.

Abstract of Patent, JP 405195450, No date.

Rose, Philip I., "Gelatin," *Encyclopedia of Chemical Technology*, 7, pp. 488–513, No date.

* cited by examiner

COLORANTS, COLORANT STABILIZERS, INK COMPOSITIONS, AND IMPROVED METHODS OF MAKING THE SAME

CROSS REFERENCE TO RELATED APPLICATION

This application claims priority to U.S. Provisional Application No. 60/175,643, filed Jan. 12, 2000, the entirety of which is incorporated herein by reference.

TECHNICAL FIELD

The present invention relates to porphines, methods for making porphines, and the use of porphines in ink compositions.

BACKGROUND OF THE INVENTION

U.S. patent application Ser. No. 08/757,222 filed Nov. 27, 1996, now U.S. Pat. No. 5,782,963; U.S. patent application Ser. No. 08/788,863 filed Jan. 23, 1997, pending; U.S. patent application Ser. No. 08/843,410 filed Apr. 15, 1997, now U.S. Pat. No. 5,855,655; U.S. patent application Ser. No. 08/903,911 filed Jul. 31, 1997, now U.S. Pat. No. 5,891,229; U.S. Provisional Patent Applications Serial Nos. 60/055,785 filed Aug. 15, 1997, and 60/062,643 filed Oct. 22, 1997; U.S. patent application Ser. No. 09/133,574 filed Aug. 13, 1998, pending; and U.S. patent application Ser. No. 09/058,385 filed Apr. 9, 1998, pending; all of which are assigned to Kimberly Clark Worldwide, Inc., disclose the use of a variety of porphines as colorant stabilizers. Porphines disclosed in the above-referenced applications include, but are not limited to, porphines having the following general structure:

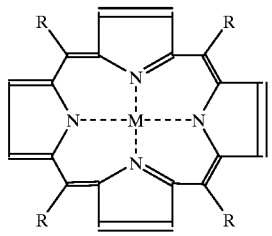

wherein R is any proton-donating moiety and M is iron, cobalt or copper. Desirably, R is $SO_3H$,

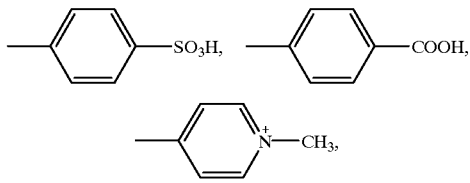

COOH, or $R_1COOH$ wherein $R_1$ is an alkyl group of from 1 to 6 carbons. R may also be in its corresponding salt form, such as $SO_3Na$ for $SO_3H$ or

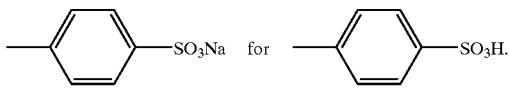

One such porphine is Cu-meso-tetra-(2-sulfanatophenyl)-porphine (designated o-CuTPPS4) having the following structure:

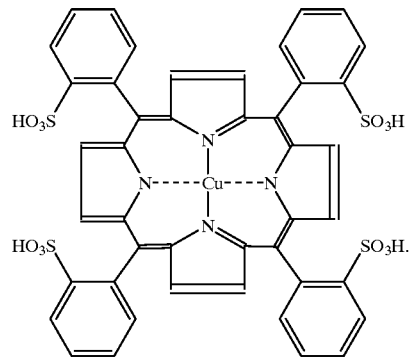

An attempt to make o-CuTPPS4 is disclosed in Treibs et al., *Leibigs Ann. Chem.*, 718, 183, 1998 (hereinafter, "Treibs"). Treibs tried to prepare o-TPPS4 from 2-formylbenzenesulfonic acid, pyrrole, and propionoic acid. However, Treibs could not isolate the resulting product. Treibs reported a yield by GLC analysis of less than about 10%.

Although porphines provide excellent light stability to colorants, some porphines are relatively unstable and/or tend to "yellow" colorant compositions containing magenta dyes. A more desirable porphine molecule would be one that has at least one of the following characteristics: (1) the porphine molecule has less tendency to "yellow" a colorant composition, (2) the porphine molecule has the ability to make the colorant composition more "blue"; and (3) the porphine molecule, when used as a colorant, has superior lightfastness properties.

Further, while some of the above-described porphines provide excellent stability to one or more colorants associated with the porphines, they do not provide an orange/red color to a composition containing the porphines.

Accordingly, there exists a need in the art for a convenient, low cost, high yield method of making porphines, and compositions containing the porphines. Further, there exists a need for improved porphines, which are capable of providing superior colorant stability while being more stable themselves and without the tendency to "yellow" colorant compositions containing magenta dyes. Finally, there exists a need in the art for a new family of compounds that may be used alone as a colorant or may be used as a colorant stabilizer for one or more colorants associated with the new compounds.

SUMMARY OF THE INVENTION

The present invention addresses the needs described above by providing a new family of porphine compounds having the following general formula:

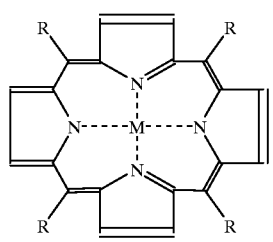

where M is iron, cobalt or copper; R represents a halogenated alkyl group,

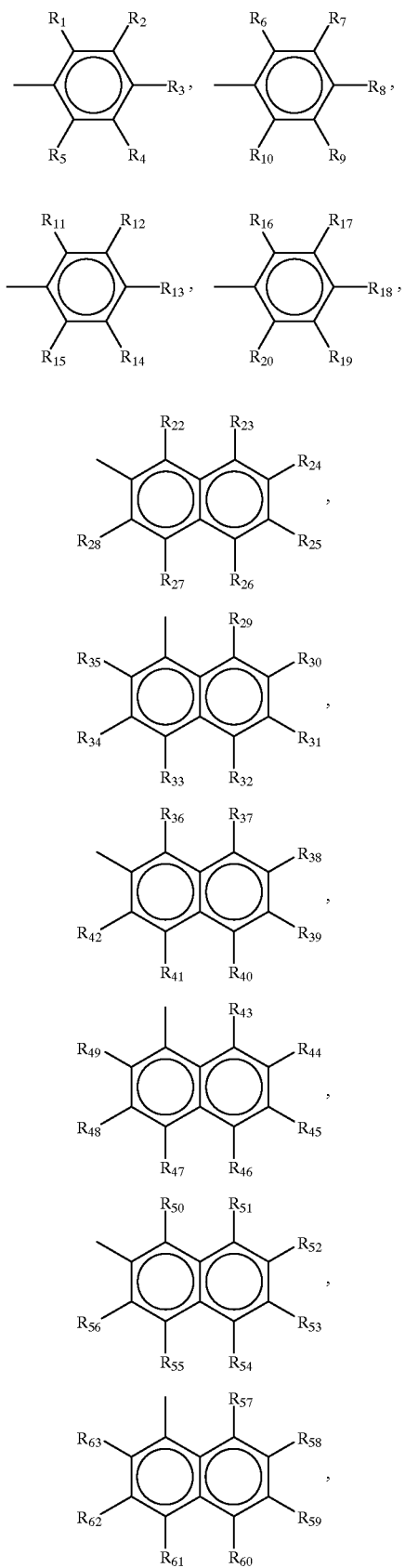

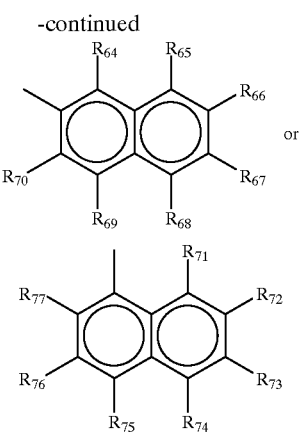

wherein $R_1$ to $R_{77}$ each independently represent —H; a halogen; an alkyl group; a substituted alkyl group; an aryl group; a substituted aryl group; an alkoxy group; a nitrogen-containing group; a sulfur-containing group; —OR', —NR'R", or —SR', wherein R' and R" each independently represent an alkyl group, a substituted alkyl group, an aryl group, or a substituted aryl group.

The porphine compounds may be used as a magenta colorant and/or as a colorant stabilizer for other colorants. The new porphine compounds, when used as a colorant stabilizer, do not "yellow" magenta dyes. Consequently, unstable dyes, such as Acid Red 52, do not need to be used to make a magenta composition. The result is a more "blue" magenta color and a higher porphine to dye ratio, which creates superior light stability.

The present invention also addresses the needs described above by providing processes of making the above-described porphines at a lower cost and higher yields. The resulting porphines may be used as a colorant stabilizer for a variety of colorants, especially magenta colorants.

The present invention also relates to colorant compositions having improved stability and lightfastness, wherein the colorant is one or more of the new porphine compounds. The present invention also relates to the use of the porphine compounds in ink compositions and ink sets.

These and other features and advantages of the present invention will become apparent after a review of the following detailed description of the disclosed embodiments and the appended claims.

DETAILED DESCRIPTION OF THE INVENTION

The present invention is directed to a new family of porphine compounds having the following general formula:

where M is iron, cobalt or copper; R represents a halogenated alkyl group,

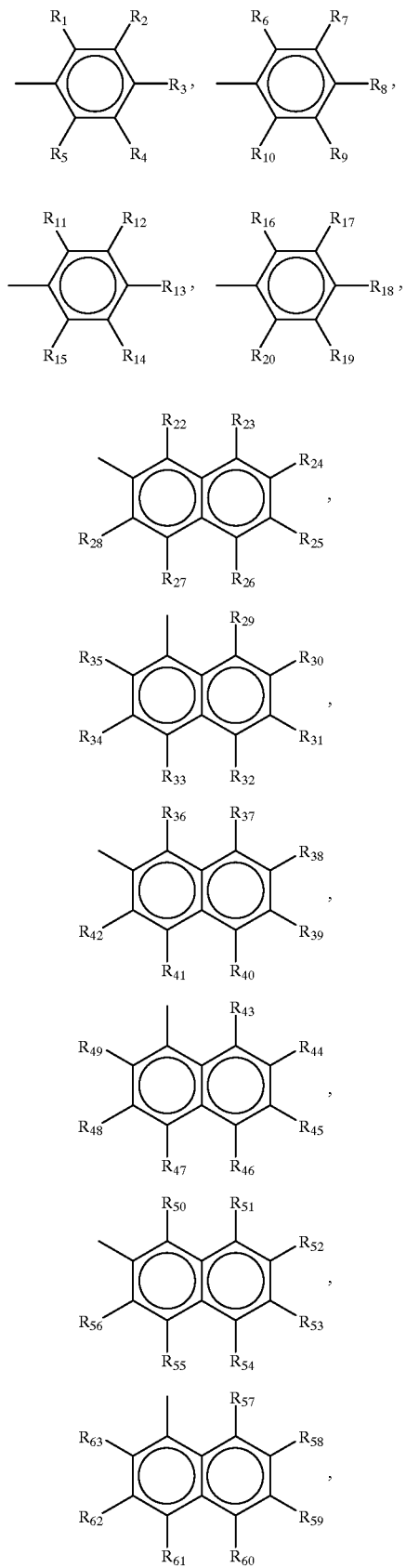

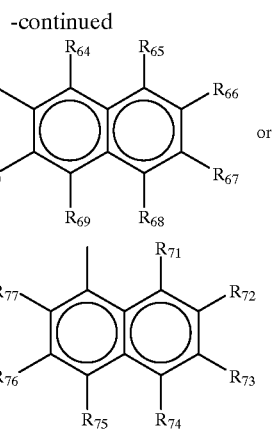

wherein $R_1$ to $R_{77}$ each independently represent —H; a halogen; an alkyl group; a substituted alkyl group; an aryl group; a substituted aryl group; an alkoxy group; a nitrogen-containing group; a sulfur-containing group; —OR', —NR'R", or —SR', wherein R' and R" each independently represent an alkyl group, a substituted alkyl group, an aryl group, or a substituted aryl group. Desirably, $R_1$ to $R_{77}$ each independently represent —H; a halogen; an alkyl group; a nitrogen-containing group; or a sulfur-containing group. More desirably, $R_1$ to $R_{77}$ each independently represent —H; chlorine; bromine; fluorine; iodine; a tert-butyl group; —$NO_2$; —$SO_3H$; —$SO_3Na$; —$SO_3Cl$; or —$SO_3Cl^-pyH^+$. Even more desirably, $R_1$ to $R_{77}$ each independently represent —H; chlorine; bromine; fluorine; or iodine. The new compounds may be used alone as an orange/red colorant or may be used as a colorant stabilizer.

The present invention also relates to colorant compositions having improved stability and lightfastness, wherein the colorant constitutes one or more of the above-described porphine compounds. Desirably, one or more of the new porphine compounds are admixed with a solvent system, as well as other composition components. The porphines may be used alone or in combination with at least one metal or metal salt. Suitable metals and metal salts are disclosed in U.S. Pat. No. 5,891,229, assigned to Kimberly Clark Worldwide, Inc., the entirety of which is incorporated herein by reference. As an example, the metal or metal salt in a composition can comprise a lanthanide or lanthanide salt. Moreover, a typical lanthanide or lanthanide salt comprises europium or europium salts. Optionally, the new porphine compounds may be associated with a molecular includant, chelating agent, or other material to improve solubility and/or interaction of the porphine compound and other colorants, if present. Suitable molecular includants, chelating agents, and other composition materials are also disclosed in U.S. Pat. No. 5,891,229. Typical molecular includants with which the porphines may be associated include one or more cyclodextrins, for example α-cyclodextrin, β-cyclodextrin, γ-cyclodextrin, δ-cyclodextrin, hydroxypropyl β-cyclodextrin, or hydroxyethyl β-cyclodextrin.

When used as a colorant stabilizer, the new porphine compounds may be associated with a variety of dyes or colorants. A suitable dye or colorant, for example, may be an organic dye. Organic dye classes include, by way of illustration only, triarylmethyl dyes, such as Malachite Green Carbinol base {4-(dimethylamino)-α-[4-(dimethylamino)

phenyl]-α-phenyl-benzene-methanol}, Malachite Green Carbinol hydrochloride {N-4-[[4-(dimethylamino)phenyl]phenyl-methylene]-2,5-cyclohexyldien-1-ylidene]-N-methyl-methanaminium chloride or bis[p-(dimethylamino)phenyl]phenylmethylium chloride}, and Malachite Green oxalate {N-4-[[4-(dimethylamino)-phenyl]-phenylmethylene]-2,5-cyclohexyldien-1-ylidene]-N-methyl-methanaminium chloride or bis[p-(dimethylamino)-phenyl]phenyl-methylium oxalate}; monoazo dyes, such as Cyanine Black, Chrysoidine [Basic Orange 2; 4-(phenylazo)-1,3-benzenediamine monohydrochloride], Victoria Pure Blue BO, Victoria Pure Blue B, basic fuschin and β-Naphthol Orange; thiazine dyes, such as Methylene Green, zinc chloride double salt [3,7-bis(dimethylamino)-6-nitrophenothiazin-5-ium chloride, zinc chloride double salt]; oxazine dyes, such as Lumichrome (7,8-dimethylalloxazine); naphthalimide dyes, such as Lucifer Yellow CH {6-amino-2-[(hydrazino-carbonyl)amino]-2,3-dihydro-1,3-dioxo-1H-benz[de]iso-quinoline-5,8-disulfonic acid dilithium salt}; azine dyes, such as Janus Green B {3-(diethylamino)-7-[[4-(dimethyl-amino)phenyl]azo]-5-phenylphenazinium chloride}; cyanine dyes, such as Indocyanine Green {Cardio-Green or Fox Green; 2-[7-[1,3-dihydro-1,1-dimethyl-3-(4-sulfobutyl)-2H-benz[e]indol-2-ylidene]-1,3,5-heptatrienyl]-1,1-dimethyl-3-(4-sulfobutyl)-1H-benz[e]indolium hydroxide inner salt sodium salt}; indigo dyes, such as Indigo {Indigo Blue or Vat Blue 1; 2-(1,3-dihydro-3-oxo-2H-indol-2-ylidene)-1,2-dihydro-3H-indol-3-one}; coumarin dyes, such as 7-hydroxy-4-methyl-coumarin (4-methylumbelliferone); benzimidazole dyes, such as Hoechst 33258 [bisbenzimide or 2-(4-hydroxyphenyl)-5-(4-methyl-1-piperazinyl)-2,5-bi-1H-benzimidazole trihydro-chloride pentahydrate]; paraquinoidal dyes, such as Hematoxylin {Natural Black 1; 7,11b-dihydrobenz[b]-indeno[1,2-d]pyran-3,4,6a,9,10(6H)-pentol}; fluorescein dyes, such as Fluoresceinamine (5-aminofluorescein); diazonium salt dyes, such as Diazo Red RC (Azoic Diazo No. 10 or Fast Red RC salt; 2-methoxy-5-chlorobenzenediazonium chloride, zinc chloride double salt); azoic diazo dyes, such as Fast Blue BB salt (Azoic Diazo No. 20; 4-benzoylamino-2,5-diethoxy-benzene diazonium chloride, zinc chloride double salt); phenylenediamine dyes, such as Disperse Yellow 9 [N-(2,4-dinitro-phenyl)-1,4-phenylenediamine or Solvent Orange 53]; diazo dyes, such as Disperse Orange 13 [Solvent Orange 52; 1-phenylazo-4-(4-hydroxyphenylazo)naphthalene]; anthra-quinone dyes, such as Disperse Blue 3 [Celliton Fast Blue FFR; 1-methylamino-4-(2-hydroxyethylamino)-9,10-anthraquinone], Disperse Blue 14 [Celliton Fast Blue B; 1,4-bis(methylamino)-9,10-anthraquinone], and Alizarin Blue Black B (Mordant Black 13); trisazo dyes, such as Direct Blue 71 {Benzo Light Blue FFL or Sirius Light Blue BRR; 3-[(4-[(4-[(6-amino-1-hydroxy-3-sulfo-2-naphthalenyl)azo]-6-sulfo-1-naphthalenyl)-azo]-1-naphthalenyl)azo]-1,5-naphthalenedisulfonic acid tetrasodium salt}; xanthene dyes, such as 2,7-dichloro-fluorescein; proflavine dyes, such as 3,6-diaminoacridine hemisulfate (Proflavine); sulfonaphthalein dyes, such as Cresol Red (o-cresolsulfonaphthalein); phthalocyanine dyes, such as Copper Phthalocyanine {Pigment Blue 15; (SP-4-1)-[29H,31H-phthalocyanato(2–)—$N^{29},N^{30},N^{31},N^{32}$]copper}; carotenoid dyes, such as trans-β-carotene (Food Orange 5); carminic acid dyes, such as Carmine, the aluminum or calcium-aluminum lake of carminic acid (7-a-D-glucopyranosyl-9,10-dihydro-3,5,6,8-tetrahydroxy-1-methyl-9,10-dioxo-2-anthracene-carbonylic acid); azure dyes, such as Azure A [3-amino-7-(dimethylamino)phenothiazin-5-ium chloride or 7-(dimethyl-amino)-3-imino-3H-phenothiazine hydrochloride]; and acridine dyes, such as Acridine Orange [Basic Orange 14; 3,8-bis(dimethylamino)acridine hydrochloride, zinc chloride double salt] and Acriflavine (Acriflavine neutral; 3,6-diamino-10-methylacridinium chloride mixture with 3,6-acridine-diamine).

The present invention is further directed to a convenient, fast, low cost, environmental-friendly process of making new porphine compounds. One process of making new porphine compounds proceeds by the following reaction, wherein N,N-dimethylformamide (DMF) is used as the solvent:

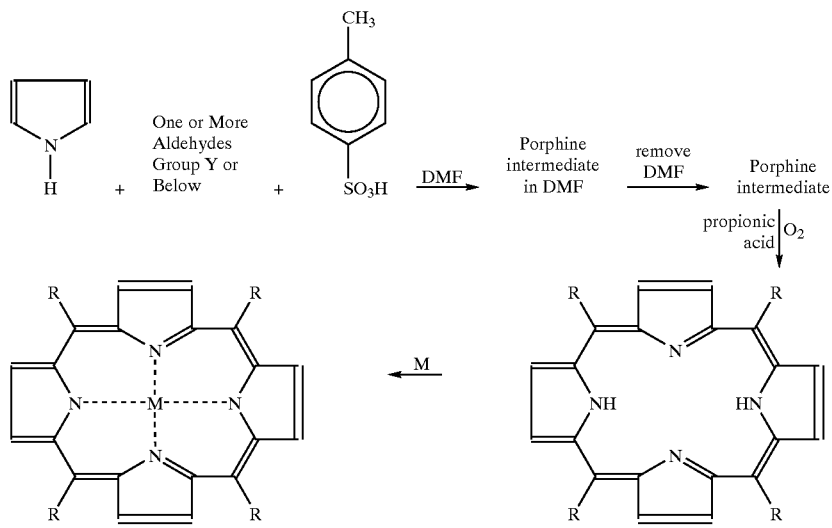

Group Y Aldehydes:

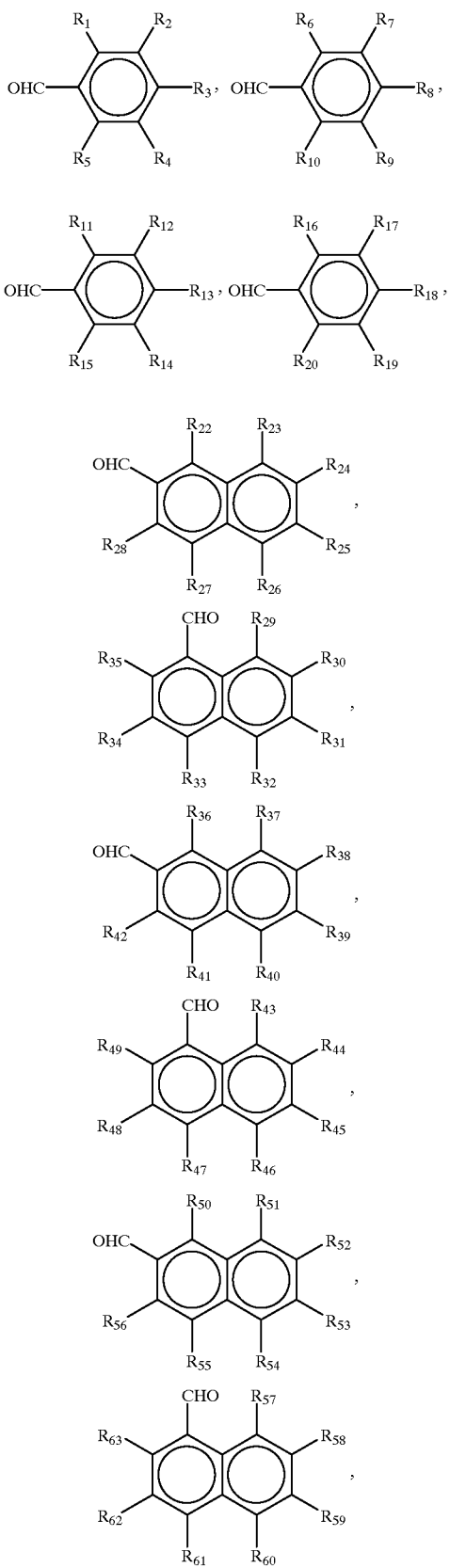

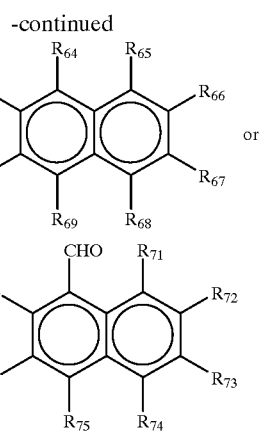

wherein $R_1$ to $R_{77}$ are as described above.

The above process produces TPPR4 (i.e., a porphine substituted with "R" groups) at yields of greater than 80%, and as high as about 96 to 97%. The TPPR4 is further reacted with a metal or metal salt, M, as defined above, to produce one of the porphine compounds of the present invention. The latter reaction proceeds at yields of greater than 90%, and as high as about 96 to 97%.

The reaction conditions for the above process may vary. Typically, the reaction may be carried out in a two-step process as follows. The reactants are purified by the following process or a similar purification process. The pyrrole is distilled under argon and a fraction is collected at 130° C. The aldehyde reactant(s) is purified by a Dean and Stark method using benzene as the solvent. The solution is filtered at 60° C. and the solid pumped in a vacuum oven overnight at room-temperature. The p-toluene sulfonic acid may also be purified by a Dean and Stark method using benzene as the solvent. It should be noted that a variety of one or more aldehyde reactants may be used in the above-described reaction.

In the first step, the aldehyde, N,N-dimethylformamide (DMF) and pyrrole are placed in a reaction vessel and stirred at room-temperature. The mixture is flushed with argon for about five minutes while stirring prior to heating. The mixture is then heated to 100° C. for about ten to twelve minutes. The toluene sulfonic acid dissolved in 15 ml of DMF is injected into the reaction mixture. The reaction mixture is heated to 150° C. and held at this temperature for about 50 minutes to form a porphine intermediate. DMF is removed under vacuum from the reaction mixture to yield a precipitate.

In the second step, the porphine intermediate is mixed with propionic acid. Air or oxygen is bubbled through the mixture at reflux for a period of time to yield a finished product. Conversion of the intermediate to the finished product may be monitored using an UV/VIS spectrometer. Reflux time may vary, but usually the reflux time is up to about 10 hours to convert the porphine intermediate to TPPR4. The TPPR4 is further reacted with a metal or metal salt, M, as defined above, to produce one of the porphine compounds of the present invention.

The choice of solvent in the first step of the above process may be any solvent, which enables the efficient production of TPPR4 and the new porphine compounds. Suitable solvents include, but are not limited to, DMF, dimethyl sulfoxide (DMSO), and dimethyl acetamide.

In one embodiment of the present invention, porphine compounds having superior lightfastness properties are produced having the following general formula:

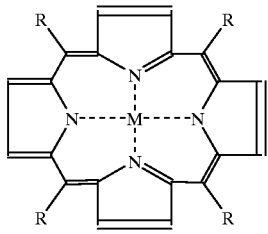

where M is iron, cobalt or copper; and R represents one or more substituents having at least one atom therein, wherein the at least one atom has a spin-orbit coupling constant greater than about 200 cm$^{-1}$. Suitable atoms having a spin-orbit coupling constant greater than about 200 cm$^{-1}$ include, but are not limited to, halogens. Desirably, the porphine compound contains at least one substituent having at least one atom therein, wherein the at least one atom has a spin-orbit coupling constant greater than about 500 cm$^{-1}$. More desirably, the porphine compound contains at least one substituent having at least one atom therein, wherein the at least one atom has a spin-orbit coupling constant greater than about 2400 cm$^{-1}$. Even more desirably, the porphine compound contains at least one substituent having at least one atom therein, wherein the at least one atom has a spin-orbit coupling constant greater than about 5000 cm$^{-1}$. In some porphine compounds, there may be a combination of two or more atoms wherein one atom has a spin-orbit coupling constant greater than about 500 cm$^{-1}$ and another atom has a spin-orbit coupling constant greater than about 5000 cm$^{-1}$. Any combination of such substituents is considered to be within the scope of the present invention.

It is believed that the above-described porphine compounds of the present invention possess superior lightfastness properties due to their reduced time in the excited state, as well as, their lower probability of being in the excited state. The presence of one or more R groups in the porphine having one or more substituents with high "Z" values (i.e., atomic number) produces the so-called "heavy atom effect" that arises from the coupling of the spin angular momentum and orbital angular momentum. This so-called "spin-orbit coupling", which generally increases with increasing Z values, enhances the rates of normally spin-forbidden electronic transitions, which enables the distribution of vibrational energy at an excited state, resulting from exposure to light, intramolecularly. The "intramolecular quenching" of the molecule results in rapid quenching of the excited state back to the ground state. The net effect being a much smaller concentration of excited state species at any one time. A general discussion of "heavy atom effect" and "spin orbital coupling", as well as values for spin orbit coupling constants, may be found in the *Handbook of Photochemistry* (Murov et al.), 2$^{nd}$ ed., pages 338–341, 1993, the entirety of which is incorporated herein by reference.

The present invention is further described by the examples which follow. Such examples, however, are not to be construed as limiting in any way either the spirit or scope of the present invention. In the examples, all parts are parts by weight unless stated otherwise.

EXAMPLE 1

Preparation of TPPS4 Intermediate

Tetra-(3-sulfanato-4-methoxyphenyl)-porphine (designated TPPS4) was prepared by mixing the following reactants in DMF solvent: pyrrole; 2-methoxy-5-formylbenzene sulfonic acid, sodium salt; and p-toluenesulfonic acid. Prior to mixing the reactants, pyrrole was distilled under an argon atmosphere with the fraction boiling at 130° C. collected. The 2-methoxy-5-formylbenzene sulfonic acid, sodium salt (Aldrich) was purified by a Dean and Stark method using benzene as the solvent. The solution was filtered at 60° C. and the resulting solid was pumped in a vacuum oven overnight at room-temperature. The DMF (99.9% anhydrous grade available from Aldrich) was used without further purification. The p-toluenesulfonic acid was purified by a Dean and Stark method using benzene as the solvent.

A mixture of 5.0 g of the pyrrole, 15.6 g of the 2-methoxy-5-formylbenzene sulfonic acid, sodium salt, and 200 ml of the DMF was placed into a 500 ml three-necked, round-bottom flask fitted with a magnetic stir bar, condenser, thermometer, and argon gas bubbler inlet. The reaction mixture was flushed with argon for five minutes with stirring prior to heating. The mixture was then heated to 100° C. for about 10–12 minutes at which time 0.76 g of p-toluenesulfonic acid was syringed into the reaction mixture. The p-toluenesulfonic acid was dissolved in 15 ml of DMF. The clear, colorless reaction mixture turned red to blood red to brown red to red black in one to two minutes. The reaction mixture was heated to 150° C. and held at this temperature for about 50 minutes.

After about 50 minutes at 150° C., the reaction was cooled in an ice bath for about 20 minutes. The DMF was removed under vacuum to yield a precipitate. The wet solid was then placed in a vacuum oven overnight at ambient temperature to dry the solid.

EXAMPLE 2

Preparation of TPPS4 in an Argon Atmosphere

Ten grams of the dried powder of Example 1 was mixed with 200 ml of propionic acid in a 500 ml three-necked round-bottom flask. The mixture was heated at reflux in an argon atmosphere. The reaction mixture was monitored by a UV/VIS spectrometer to follow conversion of the TPPS4 intermediate to TPPS4.

The mixture was refluxed for about 67 hours to yield a small amount of TPPS4 having an absorption peak at 412 nm.

EXAMPLE 3

Preparation of TPPS4 in an Open Air Condenser

Ten grams of the dried powder of Example 1 was mixed with 200 ml of propionic acid in a 500 ml three-necked round-bottom flask. The mixture was heated at reflux with an open air condenser. The reaction mixture was monitored by a UV/VIS spectrometer to follow conversion of the TPPS4 intermediate to TPPS4.

The mixture was refluxed for about 67 hours. After 10 hours of reflux, conversion to TPPS4 was substantially completed. Full conversion to TPPS4 having an absorption peak at 412 nm was completed at 67 hours.

EXAMPLE 4

Preparation of TPPS4 with Air Bubbled Into the Reaction Mixture

Ten grams of the dried powder of Example 1 was mixed with 200 ml of propionic acid in a 500 ml three-necked round-bottom flask. The mixture was heated at reflux while air was bubbled into the reaction mixture. The reaction mixture was monitored by a UV/VIS spectrometer to follow conversion of the TPPS4 intermediate to TPPS4.

The mixture was refluxed for 10 hours. Full conversion to TPPS4 having an absorption peak at 412 nm was completed in 10 hours.

EXAMPLE 5

Preparation of CuTPPS4 Colorant Stabilizer

Cu-meso-tetra-(3-sulfanato-4-methoxyphenyl)-porphine (designated CuTPPS4) was prepared by the following reaction. A mixture of 0.31 g of copper powder, 5.0 g of TPPS4 from Example 4, and 50 ml of water were added to a 200 ml round-bottom flask fitted with a condenser and magnetic stirrer bar. The mixture was heated in reflux for three hours. The hot mixture was evaporated down to about 10 ml and chilled. Acetone was added to the mixture. The precipitate was filtered and washed with hexane and toluene. The precipitate was dried under vacuum to yield 3.9 g of a solid. The yield was about 72%.

TLC showed a clean product of CuTPPS4.

EXAMPLE 6

Preparation of a Magenta Composition Containing CuTPPS4 As the Colorant

A magenta ink was prepared having the following composition wherein the components are given in weight %:

| Component | Weight % |
|---|---|
| DI Water | 85.63 |
| Borax | 1.90 |
| HCl (1N) | 1.57 |
| EDTAo2Na | 0.10 |
| CuTPPS4 (Example 5) | 0.50 |
| Ethylene Glycol | 5.00 |
| Glycerine | 5.00 |
| GIV-GARD DXN ® | 0.20 |
| COBRATEC ® 99 | 0.10 |

The ink was prepared using the following components: deionized water; borax; hydrochloric acid as a buffer/pH adjuster; EDTA or sodium salts thereof as a chelating agent; ethylene glycol and glycerine as wetting agents; GIV-GARD DXN® (Sigma-Aldrich, Milwaukee, Wis.) as a biocide; COBRATEC® 99(PMC Industries, Cincinnati, Ohio) as a corrosion inhibitor; and CuTPPS4 from Example 5 as the dye.

The magenta composition was printed onto a photoglossy medium to produce a light-stable magenta having color gamut with an enhanced blue component.

EXAMPLE 7

Preparation of a Magenta Composition Containing CuTPPS4 As a Colorant Stabilizer A magenta ink was prepared having the following composition wherein the components are given in weight %:

| Component | Weight % |
|---|---|
| DI Water | 81.54 |
| Borax | 1.90 |
| HCl (1N) | 1.57 |
| EDTAo2Na | 0.10 |
| CuTPPS4 (Example 5) | 0.50 |
| Ethylene Glycol | 5.00 |
| Glycerine | 5.00 |
| GIV-GARD DXN ® | 0.20 |
| COBRATEC ® 99 | 0.10 |
| Reactive Red 187 | 2.89 |
| Acid Red 52 | 1.20 |

The ink was prepared using the following components: deionized water; borax; hydrochloric acid as a buffer/pH adjuster; EDTA or sodium salts thereof as a chelating agent; ethylene glycol and glycerine as wetting agents; GIV-GARD DXN® (Sigma-Aldrich, Milwaukee, Wis.) as a biocide; COBRATEC® 99 (PMC Industries, Cincinnati, Ohio) as a corrosion inhibitor; Reactive Red 187 and Acid Red 52 as dyes; and CuTPPS4 from Example 5 as a colorant stabilizer.

The magenta composition was printed onto a photoglossy medium to produce a light-stable magenta having color gamut with an enhanced blue component.

EXAMPLE 8

Preparation of o-TPPS4 Precursor

Tetra-(2-sulfanatophenyl)-porphine (designated o-TPPS4) was prepared from the following reactants in a DMF solvent: pyrrole; 2-formylbenzene sulfonic acid, sodium salt; and p-toluenesulfonic acid. Prior to mixing the reactants, pyrrole was distilled under an argon atmosphere with the fraction boiling at 130° C. collected. The 2-formylbenzene sulfonic acid, sodium salt (Aldrich) was purified by a Dean and Stark method using benzene as the solvent. The solution was filtered at 60° C. and the resulting solid was pumped in a vacuum oven overnight at room-temperature. The DMF (99.9% anhydrous grade available from Aldrich) was used without further purification. The p-toluenesulfonic acid was purified by a Dean and Stark method using benzene as the solvent.

A mixture of 5.0 g of the pyrrole, 15.6 g of the 2-formylbenzenesulfonic acid, sodium salt, and 200 ml of the DMF was placed into a 500 ml three-necked, round-bottom flask fitted with a magnetic stir bar, condenser, thermometer, and argon gas bubbler inlet. The reaction mixture was flushed with argon for five minutes with stirring prior to heating. The mixture was then heated to 100° C. for about 10–12 minutes at which time 0.76 g of p-toluenesulfonic acid was syringed into the reaction mixture. The p-toluenesulfonic acid was dissolved in 15 ml of DMF. The clear, colorless reaction mixture turned red to blood red to brown red to red black in one to two minutes. The reaction mixture was heated to 150° C. and held at this temperature for about 50 minutes.

After about 50 minutes at 150° C., the reaction was cooled in an ice bath for about 20 minutes. The DMF was removed to yield a precipitate. The wet solid was then placed in a vacuum oven overnight at ambient temperature to dry the solid.

EXAMPLE 9

Preparation of o-TPPS4 in an Argon Atmosphere

Ten grams of the dried powder of Example 8 was mixed with 200 ml of propionic acid in a 500 ml three-necked round-bottom flask. The mixture was heated at reflux in an argon atmosphere. The reaction mixture was monitored by a UV/VIS spectrometer to follow conversion of the o-TPPS4 precursor to o-TPPS4.

The mixture was refluxed for about 67 hours to yield a small amount of o-TPPS4 having an absorption peak at 412 nm.

EXAMPLE 10

Preparation of o-TPPS4 in an Open Air Condenser

Ten grams of the dried powder of Example 8 was mixed with 200 ml of propionic acid in a 500 ml three-necked round-bottom flask. The mixture was heated at reflux with an open air condenser. The reaction mixture was monitored by a UV/VIS spectrometer to follow conversion of the o-TPPS4 precursor to o-TPPS4.

The mixture was refluxed for about 67 hours. After 10 hours of reflux, conversion to o-TPPS4 was substantially completed. Full conversion to o-TPPS4 having an absorption peak at 412 nm was completed at 67 hours.

EXAMPLE 11

Preparation of o-TPPS4 with Air Bubbled Into the Reaction Mixture

Ten grams of the dried powder of Example 8 was mixed with 200 ml of propionic acid in a 500 ml three-necked round-bottom flask. The mixture was heated at reflux while air was bubbled into the reaction mixture. The reaction mixture was monitored by a UV/VIS spectrometer to follow conversion of the o-TPPS4 precursor to o-TPPS4.

The mixture was refluxed for 10 hours. Full conversion to o-TPPS4 having an absorption peak at 412 nm was completed in 10 hours.

EXAMPLE 12

Preparation of o-CuTPPS4 Colorant Stabilizer

Cu-meso-tetra-(2-sulfanatophenyl)-porphine (designated o-CuTPPS4) was prepared by the following reaction. A mixture of 0.31 g of copper powder, 5.0 g of o-TPPS4 from Example 11, and 50 ml of water were added to a 200 ml round-bottom flask fitted with a condenser and magnetic stirrer bar. The mixture was heated in reflux for three hours. The hot mixture was evaporated down to about 10 ml and chilled. Acetone was added to the mixture. The precipitate was filtered and washed with hexane and toluene. The precipitate was dried under vacuum to yield 3.9 g of a solid. The yield was about 72%.

TLC showed a clean product of o-CuTPPS4.

EXAMPLE 13

Preparation of a Magenta Composition Containing o-CuTPPS4 Colorant Stabilizer

A magenta ink was prepared having the following composition wherein the components are given in weight %:

| Component | Weight % |
|---|---|
| DI Water | 81.54 |
| Borax | 1.90 |
| HCl (1N) | 1.57 |

-continued

| Component | Weight % |
|---|---|
| EDTAo2Na | 0.10 |
| o-CuTPPS4 (Example 12) | 0.50 |
| Ethylene Glycol | 5.00 |
| Glycerine | 5.00 |
| GIV-GARD DXN ® | 0.20 |
| COBRATEC ® 99 | 0.10 |
| Reactive Red 187 | 2.89 |
| Acid Red 52 | 1.20 |

The ink was prepared using the following components: deionized water; borax; hydrochloric acid as a buffer/pH adjuster; EDTA or sodium salts thereof as a chelating agent; ethylene glycol and glycerine as wetting agents; GIV-GARD DXN® (Sigma-Aldrich, Milwaukee, Wis.) as a biocide; COBRATEC® 99 (PMC Industries, Cincinnati, Ohio) as a corrosion inhibitor; Reactive Red 187 and Acid Red 52 as dyes; and o-CuTPPS4 from Example 12 as a colorant stabilizer.

The magenta composition was printed onto a photoglossy medium to produce a light-stable magenta having color gamut with an enhanced blue component.

EXAMPLE 14

Preparation of Tetranaphthyl Porphine (TNP)

Tetra-(1-naphthyl) porphine (designated TNP) was prepared from the following reactants in a DMSO solvent: pyrrole and 1-naphthaldehyde. Prior to mixing the reactants, pyrrole was distilled under an argon atmosphere with the fraction boiling at 130° C. collected. The 1-naphthaldehyde was distilled under vacuum to purify. A mixture of 6.0 g of pyrrole, 13.7 g of 1-naphthaldehyde, and 120 ml or DMSO were heated at reflux for 2 hours. The reaction solution was cooled and the DMSO solvent partially removed under vacuum. The solid that was present was filtered off and washed with 60 ml of methanol, 60 ml of hot water, and 12 ml of cold methanol. The resulting solid was then dried in a vacuum oven at ambient temperature overnight.

Conversion to TNP was monitored by UV/VIS spectrometry ($\lambda_{max}$ 420 nm). The yield of TNP was about 79%.

EXAMPLE 15

Preparation of CuTNP Colorant

The compound Cu-meso-tetra(1-naphthyl)-porphine (designated CuTNP) was prepared by the following reaction. A mixture of 0.24 g of $Cu(O_2CCH_3)_2oH_2O$, 1 g of TNP from Example 14, and 73 ml of DMF was heated to 120° C. for 60 minutes at which time the reaction had changed to reddish in color. The reaction mixture was cooled and poured into 200 ml of ice water, and the resulting mixture was extracted with diethyl ether. After washing the ether with water and drying over $MgSO_4$, the solvent was removed under vacuum to yield the desired CuTNP. The product was characterized by mass spectrometry (875 M$^+$) and UV/VIS spectrometry ($\lambda_{max}$ 420 nm, 540 nm). The yield of CuTNP was 77%.

Having thus described the invention, numerous changes and modifications thereof will be readily apparent to those having ordinary skill in the art, without departing from the spirit or scope of the invention.

What is claimed is:

1. An ink composition comprising a porphine having the following general formula:

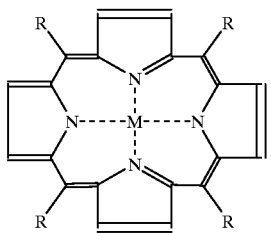

where M is iron, cobalt or copper; R represents a halogenated alkyl group,

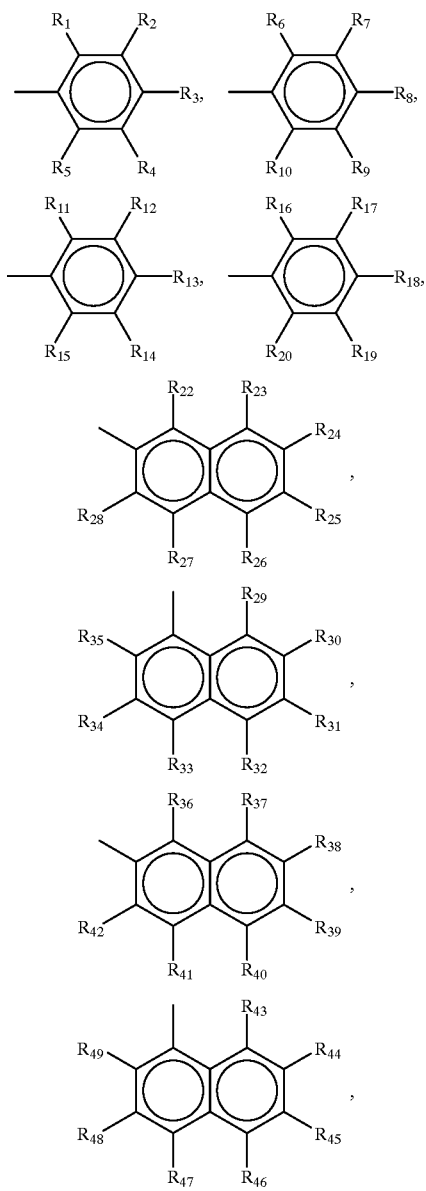

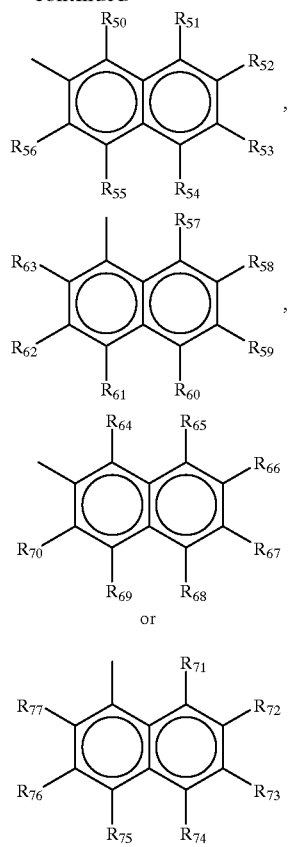

wherein $R_1$ to $R_{77}$ each independently represent —H; a halogen; an alkyl group; a substituted alkyl group; an aryl group; a substituted aryl group; an alkoxy group; a nitrogen-containing group; a sulfur-containing group other than —SR', wherein $R_3$, $R_8$, $R_{13}$, and $R_{18}$ are not concurrently sulfur-containing groups; —OR', —NR'R", or —SR', wherein R' and R" each independently represent an alkyl group, a substituted alkyl group, an aryl group, or a substituted aryl group.

2. The ink composition of claim 1, wherein $R_1$ to $R_{77}$ each independently represent —H; a halogen; an alkyl group; a nitrogen-containing group; or a sulfur-containing group other than SR'.

3. The ink composition of claim 1, wherein $R_1$ to $R_{77}$ each independently represent —H; chlorine; bromine; fluorine; iodine; a tert-butyl group; —$NO_2$; —$SO_3H$; —$SO_3Na$; —$SO_3Cl$; or —$SO_3Cl^-pyH^+$.

4. The ink composition of claim 1, wherein $R_1$ to $R_{77}$ each independently represent —H; chlorine; bromine; fluorine; or iodine.

5. The ink composition of claim 1, wherein the composition further comprises one or more colorants.

6. The ink composition of claim 1, wherein the composition further comprises at least one metal or metal salt.

7. The ink composition of claim 6, wherein the metal or metal salt comprises a lanthanide or lanthanide salt.

8. The ink composition of claim 7, wherein the lanthanide or lanthanide salt comprises europium or europium salt.

9. The ink composition of claim 1, wherein the composition further comprises a colorant, a molecular includant, a chelating agent, or a combination thereof.

10. The ink composition of claim 9, comprising a molecular includant.

11. The ink composition of claim 10, wherein the molecular includant is one or more cyclodextrins.

12. The ink composition of claim 11, wherein the one or more cyclodextrins comprise α-cyclodextrin, β-cyclodextrin, γ-cyclodextrin, δ-cyclodextrin, hydroxypropyl β-cyclodextrin, or hydroxyethyl β-cyclodextrin.

13. A porphine compound having the following general formula:

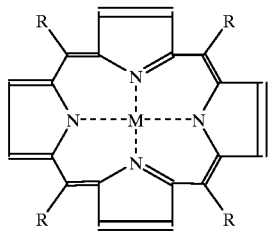

where M is iron, cobalt or copper; R represents a halogenated alkyl group,

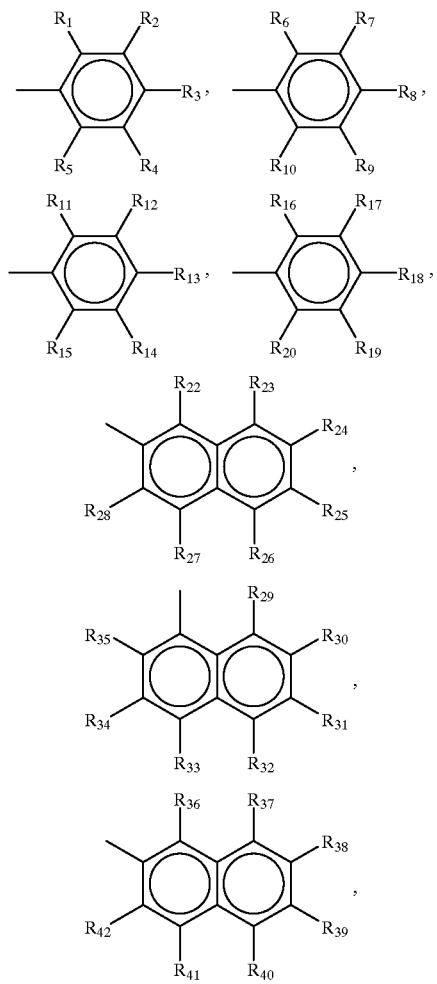

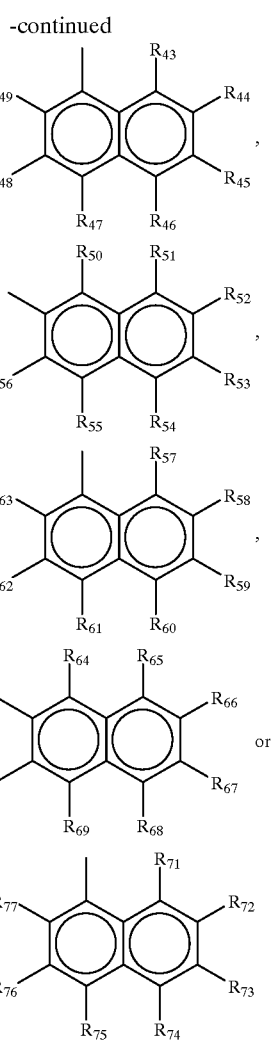

wherein $R_1$ to $R_{77}$ each independently represent —H; a halogen; an alkyl group; a substituted alkyl group; an aryl group; a substituted aryl group; an alkoxy group; a nitrogen-containing group; a sulfur-containing group other than —SR', wherein $R_3$, $R_8$, $R_{13}$, and $R_{18}$ are not concurrently sulfur-containing groups; —OR', —NR'R", or —SR', wherein R' and R" each independently represent an alkyl group, a substituted alkyl group, an aryl group, or a substituted aryl group.

14. The porphine of claim 13, wherein $R_1$ to $R_{77}$ each independently represent —H; a halogen; an alkyl group; a nitrogen-containing group; or a sulfur-containing group other than SR'.

15. The porphine of claim 13, wherein $R_1$ to $R_{77}$ each independently represent —H; chlorine; bromine; fluorine; iodine; a tert-butyl group; —$NO_2$; —$SO_3H$; —$SO_3Na$; —$SO_3Cl$; or —$SO_3Cl^-pyH^+$.

16. The porphine of claim 13, wherein $R^1$ to $R_{77}$ each independently represent —H; chlorine; bromine; fluorine; or iodine.

17. An ink composition comprising the porphine of claim 13.

18. A method of making a porphine, said method comprising:
   forming a first reaction mixture of one or more aldehydes, pyrrole, a substituted toluene compound, and a solvent;
   heating the first reaction mixture to form a porphine precursor;

removing the solvent to yield a precursor precipitate;

mixing the precipitate with propionic acid to form a second reaction mixture;

heating the second reaction mixture at reflux to yield the porphine.

19. The method of claim 18, wherein the one or more aldehydes comprises one or more of

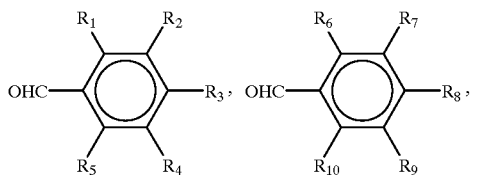

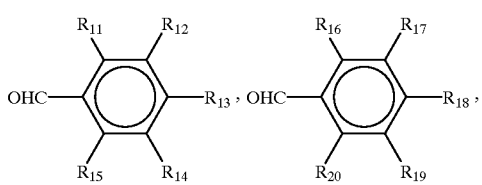

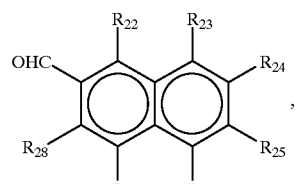

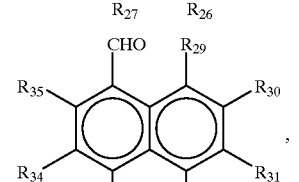

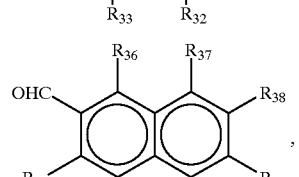

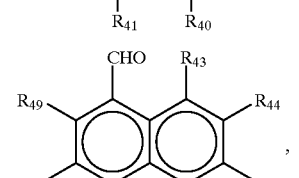

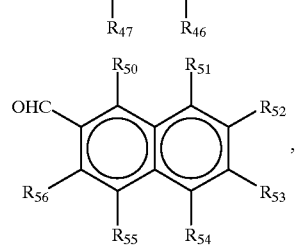

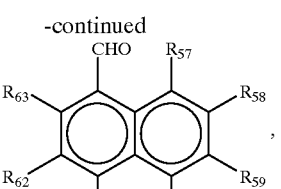

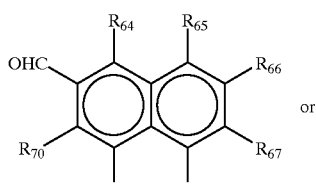

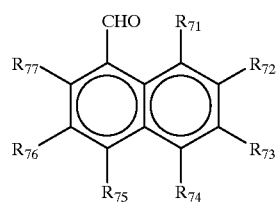

wherein $R_1$ to $R_{77}$ each independently represent —H; a halogen; an alkyl group; a substituted alkyl group; an aryl group; a substituted aryl group; an alkoxy group; a nitrogen-containing group; a sulfur-containing group; —OR', —NR'R", or —SR', wherein R' and R" each independently represent an alkyl group, a substituted alkyl group, an aryl group, or a substituted aryl group.

20. The method of claim 18, wherein the solvent is dimethylformamide, dimethyl sulfoxide, or mixtures thereof.

21. The method of claim 20, wherein the solvent is dimethylformamide.

22. The method of claim 18, wherein the first reaction mixture is heated at about 150° C. for about one hour in an argon atmosphere.

23. The method of claim 18, wherein the actual yield of the porphine is greater than about 90%.

24. The method of claim 18, wherein the actual yield of the porphine is about 96%.

25. The method of claim 18, wherein air is bubbled through the second reaction mixture during reflux.

26. The method of claim 18, wherein oxygen is bubbled through the second reaction mixture during reflux.

27. The method of claim 18, further comprising mixing the porphine with a metal salt to form a porphine compound containing a metal.

28. The method of claim 27, wherein the porphine comprises:

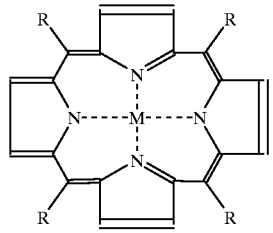

where M is iron, cobalt or copper; R represents a halogenated alkyl group,

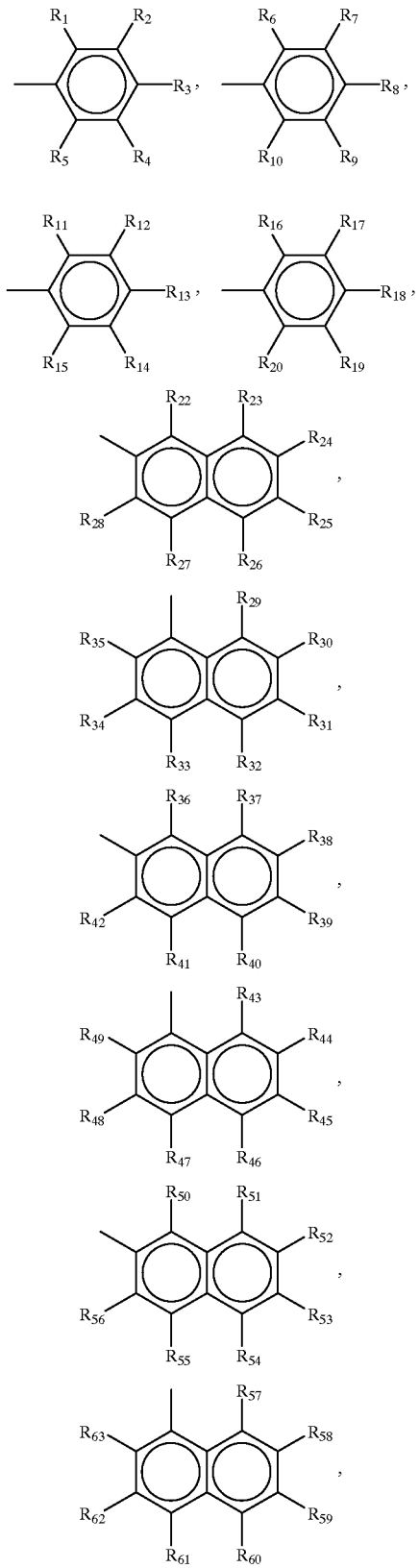

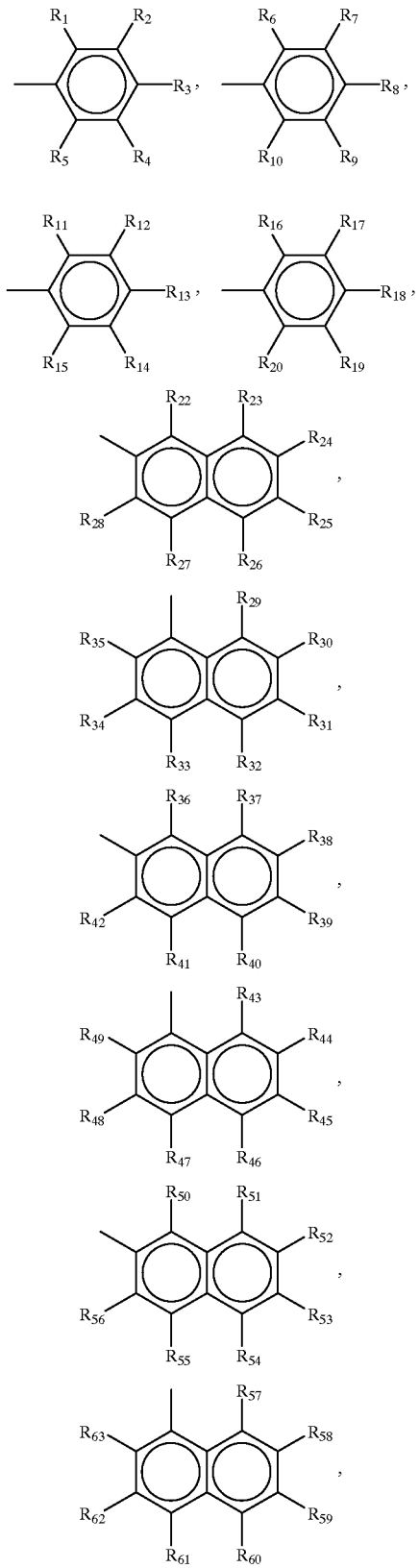

wherein $R_1$ to $R_{77}$ each independently represent —H; a halogen; an alkyl group; a substituted alkyl group; an aryl group; a substituted aryl group; an alkoxy group; a nitrogen-containing group; a sulfur-containing group; —OR', —NR'R", or —SR', wherein R' and R" each independently represent an alkyl group, a substituted alkyl group, an aryl group, or a substituted aryl group.

29. The method of claim 27, wherein the porphine comprises:

wherein $R_1$ represents an alkyl group having from 1 to 6 carbon atoms, an aryl group, or a substituted aryl group.

30. A method of light stabilizing a colorant, comprising associating the colorant with the porphine produced by the method of claim 27.

31. A method of making an ink comprising the porphine produced by the method of claim 27.

32. A porphine produced by the method of claim 27.

33. An ink composition comprising at least one porphine produced by the method of claim 27.

34. A porphine compound having the following general formula:

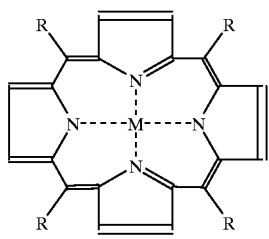

where M is iron, cobalt or copper; and R represents one or more substituents having at least one atom therein, wherein the at least one atom has a spin-orbit coupling constant greater than about 200 cm$^{-1}$.

35. The porphine compound of claim 34, wherein the one or more substituents have at least one atom therein with a spin-orbit coupling constant greater than about 500 cm$^{-1}$.

36. The porphine compound of claim 35, wherein the one or more substituents have at least one atom therein with a spin-orbit coupling constant greater than about 2400 cm$^{-1}$.

37. The porphine compound of claim 36, wherein the one or more substituents have at least one atom therein with a spin-orbit coupling constant greater than about 5000 cm$^{-1}$.

* * * * *